(12) United States Patent  
Oda

(10) Patent No.: US 8,604,808 B2  
(45) Date of Patent: Dec. 10, 2013

(54) INDICATOR POSITION DETECTING DEVICE AND INDICATOR POSITION DETECTING METHOD

(75) Inventor: Yasuo Oda, Saitama (JP)

(73) Assignee: Wacom Co., Ltd., Saitama (JP)

( * ) Notice: Subject to any disclaimer, the term of this patent is extended or adjusted under 35 U.S.C. 154(b) by 277 days.

(21) Appl. No.: 13/025,044

(22) Filed: Feb. 10, 2011

(65) Prior Publication Data

US 2011/0241651 A1  Oct. 6, 2011

(30) Foreign Application Priority Data

Mar. 30, 2010  (JP) .................................. 2010-077141

(51) Int. Cl.
- *G06F 3/041* (2006.01)
- *G06F 3/044* (2006.01)
- *G01R 23/02* (2006.01)

(52) U.S. Cl.
USPC .......................... 324/658; 324/76.39; 345/171

(58) Field of Classification Search
USPC ........... 345/173–178; 324/658–690; 340/524, 340/654, 664, 691.8; 166/301, 319, 65.1; 178/18.01, 18.03, 18.06
See application file for complete search history.

(56) References Cited

U.S. PATENT DOCUMENTS

| | | | |
|---|---|---|---|
| 5,691,512 A | * | 11/1997 | Obi .............................. 178/18.04 |
| 2007/0229468 A1 | * | 10/2007 | Peng et al. ..................... 345/173 |
| 2007/0257890 A1 | * | 11/2007 | Hotelling et al. .............. 345/173 |
| 2008/0158167 A1 | * | 7/2008 | Hotelling et al. .............. 345/173 |
| 2008/0309625 A1 | | 12/2008 | Krah et al. |
| 2010/0045614 A1 | * | 2/2010 | Gray et al. ..................... 345/173 |

FOREIGN PATENT DOCUMENTS

| | | |
|---|---|---|
| JP | 5224818 A | 9/1993 |
| JP | 8087369 A | 4/1996 |
| JP | 8179871 A | 7/1996 |
| JP | 9045184 A | 2/1997 |
| JP | 2000112642 A | 4/2000 |
| JP | 2009054141 A | 3/2009 |

OTHER PUBLICATIONS

Japanese Office Action dated Oct. 1, 2013, for corresponding JP Application No. 2010-077141, 3 pages.

* cited by examiner

*Primary Examiner* — Arleen M Vazquez  
*Assistant Examiner* — Brent J Andrews  
(74) *Attorney, Agent, or Firm* — Seed IP Law Group PLLC

(57) ABSTRACT

An indicator position detecting device and method are provided, which allow accurate position detection without the influence of noise in detection of the position of an indicator (e.g., a finger, a stylus pen) by a capacitive coupling system. To a conductor pattern in which plural conductors for signal transmission and plural conductors for signal reception intersect with each other, signals with frequencies different from each other are simultaneously supplied to the plural conductors on the transmission side, and signals of respective frequencies corresponding to the plural signals with the different frequencies are detected on the reception side, to thereby detect the position of an indicator on the conductor pattern. The amount of noise of each of the detected frequencies is detected. Any frequency that cannot be properly detected due to noise is switched to another frequency, and detection is carried out based on the newly selected frequency.

21 Claims, 15 Drawing Sheets

INDICATOR POSITION DETECTING DEVICE AND INDICATOR POSITION DETECTING METHOD

CROSS-REFERENCE TO RELATED APPLICATION

The present application claims priority under 35 U.S.C. §119(a) of Japanese Application No. 2010-077141, filed Mar. 30, 2010, the entire content of which is incorporated herein by reference.

TECHNICAL FIELD

The present invention relates to an indicator position detecting device and an indicator position detecting method, and more specifically relates to an indicator position detecting device and an indicator position detecting method for detecting the position of an indicator by an capacitive coupling system.

BACKGROUND ART

Conventionally, as the system for detecting the position of an indicator, such as a finger and a dedicated pen, used for a touch panel etc., various systems such as a resistive film system and an capacitive coupling system (capacitance system) have been proposed, for example. Among them, an indicator position detecting device of the capacitive coupling system is being actively developed in recent years.

As the capacitive coupling system, there are two kinds of systems as roughly classified: the surface type (Surface Capacitive Type) and the projected type (Projected Capacitive Type). The surface type is applied to, e.g., ATM (Automated Teller Machine) etc., and the projected type is applied to, e.g., a cellular phone etc. In both systems, change in the state of capacitive coupling between an electrically-conductive film and an indicator (e.g., finger, capacitive pen, etc.) is detected, and the position of the indicator is detected.

An indicator position detecting device of the capacitive coupling system of the projected type is configured by forming an electrode with a predetermined pattern on a transparent substrate or a transparent film for example, and detects change in the state of capacitive coupling between an indicator and the electrode when the indicator gets close to the device. Conventionally, for the indicator position detecting device of such a system, various techniques for optimizing the configuration thereof have been proposed (refer to, e.g., Patent Documents 1 to 5).

Here, a simple description will be made with reference to a drawing about the operation of an indicator position detecting device of the capacitive coupling system of the cross-point type, which has developed from the capacitive coupling system of the projected type. In FIG. 20, the schematic configuration of a sensor part of the indicator position detecting device of the capacitive coupling system of the cross-point type and the principle of position detection are shown.

In general, a sensor part 300 includes a transmitting conductor group 303 composed of plural transmitting conductors 304 and a receiving conductor group 301 composed of plural receiving conductors 302. An insulating layer is disposed between the transmitting conductor group 303 and the receiving conductor group 301. The transmitting conductor 304 is a conductor extended along a predetermined direction (X-direction in FIG. 20), and the plural transmitting conductors 304 are disposed in parallel and spaced apart from each other by a predetermined interval. Furthermore, the receiving conductor 302 is a conductor that is extended along a direction (Y-direction in FIG. 20) intersecting with the extending direction of the transmitting conductor 304 and has a predetermined shape, and the plural receiving conductors 302 are disposed in parallel and spaced apart from each other by a predetermined interval.

In the sensor part 300 with such a configuration, a predetermined signal is supplied to the predetermined transmitting conductor 304, and a change in the current flowing to the intersection (hereinafter referred to as the "cross-point") of the predetermined transmitting conductor 304 and the receiving conductor 302 is detected for each cross-point. Such a detection system is generally called the capacitive coupling system of the cross-point type. At the position where an indicator 310 (finger etc.) is placed, a current is partially diverted via the indicator 310. Therefore, the position of the indicator 310 can be detected by detecting the cross-point at which a current change has occurred. Furthermore, in the indicator position detecting device of the capacitive coupling system of the cross-point type, plural cross-points are provided on the sensor part 300 and thus detection of multiple points is possible.

The principle of the position detection of the capacitive coupling system of the cross-point type will be described more specifically. For example, now, consideration will be given to an example in which a predetermined signal is supplied to the transmitting conductor $Y_6$ and the position indicated by the indicator 310 on the transmitting conductor $Y_6$ is detected as shown in FIG. 20. In the state in which the signal is supplied to the transmitting conductor $Y_6$, first, a change in the current flowing through the receiving conductor $X_1$ is detected via an amplifier 305. Subsequently, after a predetermined time, the receiving conductor is switched to $X_2$ and a change in the current flowing through the receiving conductor $X_2$ is detected. This operation is repeated through the receiving conductor $X_M$.

Next, in the state in which switching to, e.g., the transmitting conductor $Y_7$ is made and a signal is supplied thereto, the receiving conductor is sequentially switched and a level change of the signal at the position of each of the cross-points on the transmitting conductor $Y_7$ is obtained via the amplifier 305 in the above-described manner. In this manner, a level change of the signal at the positions of all cross-points is obtained.

In the example shown in FIG. 20, the indicator 310 is placed near the cross-points with the receiving conductors $X_5$ and $X_{M-5}$ on the transmitting conductor $Y_6$, and thus the current flowing near these cross-points changes. Consequently, the output signal of the amplifier 305 changes at the positions corresponding to the vicinity of the cross-points of the receiving conductors $X_5$ and $X_{M-5}$ on the transmitting conductor $Y_6$. Therefore, the position of the indicator 310 can be detected based on this signal change.

PRIOR ART DOCUMENTS

Patent Documents

[Patent Document 1]
Japanese Patent Laid-open No. Hei 5-224818
[Patent Document 2]
Japanese Patent Laid-open No. Hei 8-87369
[Patent Document 3]
Japanese Patent Laid-open No. Hei 8-179871
[Patent Document 4]
Japanese Patent Laid-open No. Hei 9-45184
[Patent Document 5]
Japanese Patent Laid-open No. 2000-112642

SUMMARY OF THE INVENTION

In the conventional indicator position detecting device of the capacitive coupling system of the cross-point type like the above-described device, noise included in the signal detected by the receiving conductor group often becomes a problem. Specifically, for example in FIG. 20, in which the position of the indicator is detected from the output signal of the amplifier 305, there is supposedly a case in which the position of the indicator cannot be accurately detected if any noise is superimposed on the output signal.

Furthermore, in the indicator position detecting device of this kind, the position detection processing for the respective cross-points is sequentially executed every predetermined time and therefore there is a problem that the detection time of all cross-points is long. For example, if the detection processing time at each cross-point is, e.g., 256 μsec in the sensor part including 64 transmitting conductors and 128 receiving conductors, a detection time of about two seconds is required for all cross-points (8192 points), which is impractical.

In view of the above-described problems, the present invention is directed to allowing high-speed, reliable position detection in detecting the position of an indicator by the capacitive coupling system.

In order to solve the above-described problems, the indicator position detecting device of an embodiment of the present invention has a configuration including, a conductor pattern that is composed of a plurality of conductors disposed along a first direction and a plurality of conductors disposed along a second direction intersecting with the first direction, wherein the conductor pattern is for detecting position indication by an indicator, a multi-frequency signal supply circuit for supplying a plurality of signals with different frequencies to the plurality of conductors disposed along the first direction, a frequency analyzing circuit that is supplied with signals from the plurality of conductors disposed along the second direction, wherein the frequency analyzing circuit is configured to carry out frequency analysis of a signal based on position indication by the indicator with respect to the conductor pattern, an indicated-position detecting circuit that is supplied with a signal from the frequency analyzing circuit and is configured to detect position indication by the indicator with respect to the conductor pattern, a noise analyzing circuit configured to carry out frequency analysis of a noise signal received by the conductor pattern, and a control circuit configured to control allocation of frequencies of multi-frequency signals supplied from the multi-frequency signal supply circuit to the plurality of conductors disposed along the first direction based on frequency analysis of a noise signal by the noise analyzing circuit, to suppress the influence of the noise signal on detection of position indication by the indicator in the indicated-position detecting circuit.

Furthermore, the indicator position detecting method of an embodiment of the present invention is carried out according to the following procedure.

Specifically, the indicator position detecting method includes, a multi-frequency signal supply step of supplying a plurality of signals with different frequencies to a plurality of conductors disposed along a first direction, in a conductor pattern that is composed of the plurality of conductors disposed along the first direction and a plurality of conductors disposed along a second direction intersecting with the first direction, wherein the conductor pattern is for detecting position indication by an indicator, a frequency analysis step of carrying out frequency analysis of a signal from the plurality of conductors disposed along the second direction, an indicated-position detection step of being supplied with a signal subjected to the frequency analysis in the frequency analysis step and detecting position indication by the indicator with respect to the conductor pattern, a noise analysis step of carrying out frequency analysis of a noise signal received by the conductor pattern, and a control step of controlling allocation of frequencies of multi-frequency signals supplied to the plurality of conductors disposed along the first direction in the multi-frequency signal supply step based on the frequency analysis of the noise signal in the noise analysis step, to thereby suppress the influence of the noise signal on detection of position indication by the indicator in the indicated-position detection step.

In the present invention, the plurality of signals with different frequencies are simultaneously supplied to the plurality of conductors on the transmission side, and signals of the individual frequencies corresponding to the plurality of signals with different frequencies are detected on the reception side to detect the position of the indicator on the conductor pattern. Moreover, by switching the transmission frequency depending on the reception status of the signals of the respective frequencies, the frequency that can be favorably detected is used.

In the present invention, the plurality of signals with different frequencies are simultaneously supplied to the plurality of conductors on the transmission side, and frequency analysis of signals from the respective receiving conductors is carried out to thereby detect the position of the indicator on the conductor pattern on the reception side. Due to this configuration, the position detection processing at a plurality of cross-points can be simultaneously executed for each receiving conductor. Thus, in the indicator position detecting device of the capacitive coupling system, position detection at higher speed is enabled.

In this case, for example if noise working as an obstruction is detected for a signal of a specific frequency, a changeover is so made that a signal of a frequency other than the frequency detected as the noise is used. This enables the indicator position detection with avoidance of noise, and enables high-speed, stable indicator position detection.

DESCRIPTION OF THE INVENTION

Modes for carrying out the present invention will be described below with reference to the accompanying drawings. The description will be made in the order of the following items.
1. Basic Configuration Common to Respective Embodiments
2. First Embodiment (example in which respective frequencies are switched (changed-over) and multiplexed)
3. Second Embodiment (example in which respective frequencies are added and multiplexed)
4. Third Embodiment (example in which a spare frequency for changeover (switching) is separately prepared)
5. Modification Example 1: example in which frequencies are multiplexed with a block configuration
6. Modification Example 2: example in which the phase of a generated signal is controlled <1. Basic Configuration Common to Respective Embodiments>

First, a basic configuration example of the indicator position detecting device and the indicator position detecting method of the present invention will be described.

In the present embodiment, transmission signals are simultaneously supplied to the respective transmitting conductors making up a transmitting conductor group of a sensor part. Furthermore, the present embodiment has a configuration in which signals are simultaneously received from the respective receiving conductors making up a receiving conductor group. A description will be made later about a configuration in which the transmitting conductor group or the receiving conductor group is divided into plural groups and signals of plural frequencies are simultaneously supplied (multiplexed transmission) group by group. Hereinafter, the signal supply form of the present embodiment will be referred to as the "frequency multiplexing system," and the signal that is supplied and includes plural frequencies is generically referred to as the "multi-frequency signal." The position detecting system exemplified in the present invention is the capacitive coupling system, in which the position of an indicator is detected based on a change in the state of capacitive coupling between the transmitting conductor and the receiving conductor of the sensor part.

[Basic Configuration of Indicator Position Detecting Device: FIG. 1 to FIG. 6A-FIG. 6C]

Figure 1:
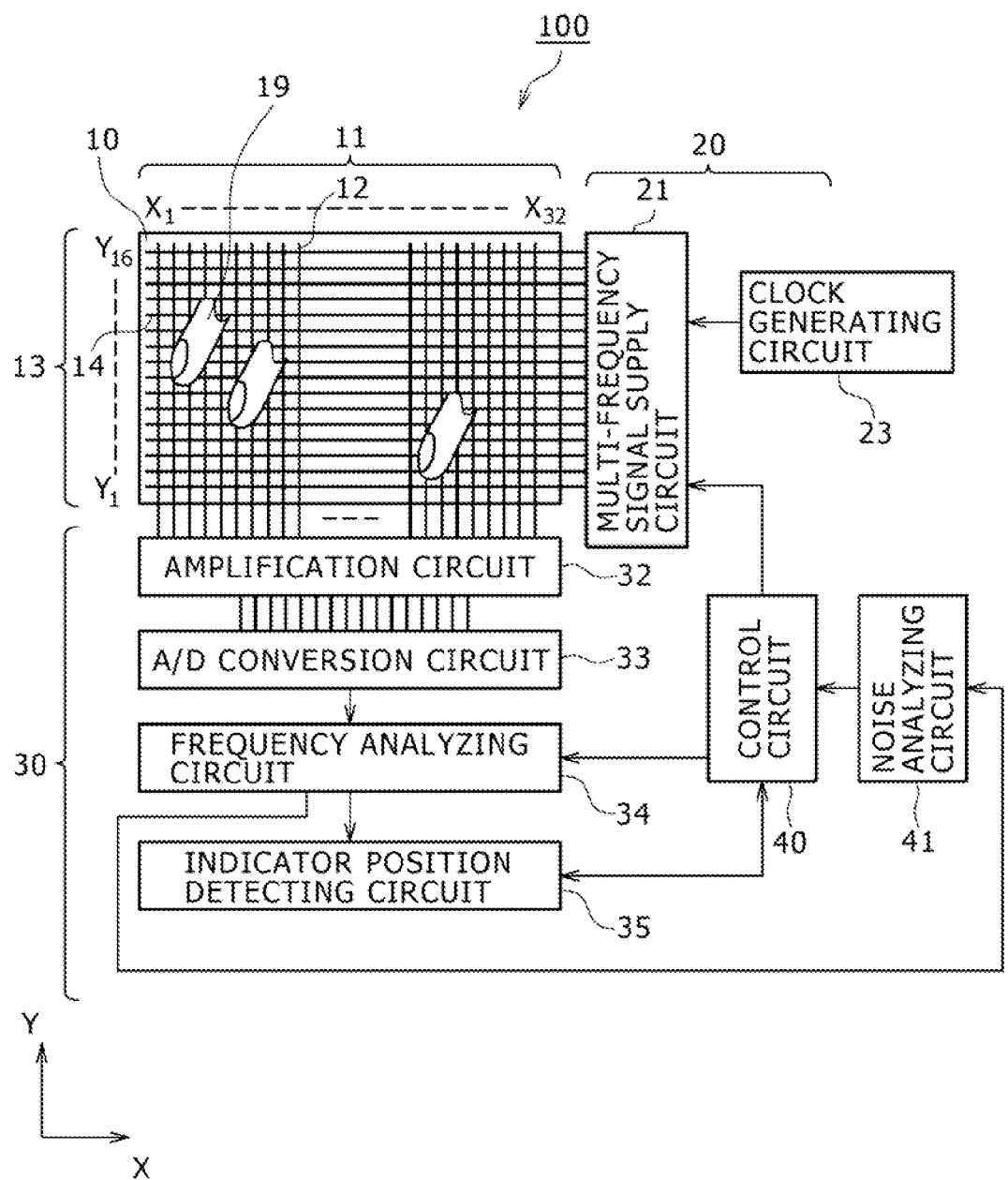
FIG. 1 is a schematic block configuration diagram of an indicator position detecting device according to an embodiment of the present invention.

In FIG. 1, the basic schematic configuration of the indicator position detecting devices of the respective embodiments of the present invention is shown.

An indicator position detecting device 100 is composed mainly of a sensor part 10, a transmission part 20, a reception part 30, a control circuit 40 that controls the operation of the transmission part 20 and the reception part 30, and so forth. The configurations of the respective parts will be described below.

Figure 2A:
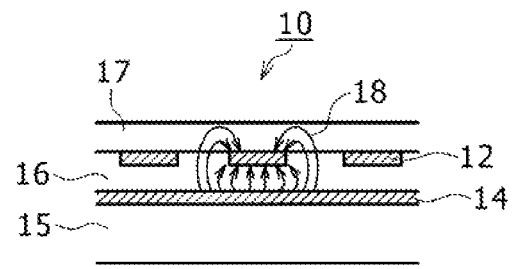
FIG. 2A is an explanatory diagram showing the state of capacitive coupling between a transmitting conductor and a receiving conductor in the case in which an indicator does not exist on a sensor part.
Figure 2B:
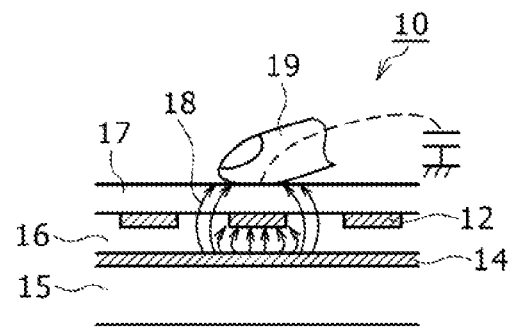
FIG. 2B is an explanatory diagram showing the state of capacitive coupling between the transmitting conductor and the receiving conductor in the case in which an indicator exists on the sensor part.

First, the configuration of the sensor part 10 will be described with reference to FIG. 1, FIG. 2A, and FIG. 2B. FIG. 2A and FIG. 2B are schematic sectional views of the sensor part 10 and are sectional views viewed from (in) the Y-direction in FIG. 1. As shown in FIG. 2A and FIG. 2B, the sensor part 10 includes a first glass substrate 15, a receiving conductor group 11 composed of plural receiving conductors 12, a spacer 16, a transmitting conductor group 13 composed of plural transmitting conductors 14, and a second glass substrate 17. Furthermore, the transmitting conductor group 13, the spacer 16, the receiving conductor group 11, and the second glass substrate 17 are disposed in that order over the first glass substrate 15.

Furthermore, in this first embodiment, an indicator such as a finger and an capacitive pen is used on the side of the second glass substrate 17 (the side of the surface of the second glass substrate 17 that is opposite to the surface opposed to the first glass substrate 15). Moreover, in this first embodiment, a sheet-shaped (film-shaped) base composed of a synthetic resin or the like may be used instead of the first glass substrate 15 and the second glass substrate 17.

The transmitting conductor 14 and the receiving conductor 12 are formed by, e.g., a transparent electrode film formed of an ITO (Indium Tin Oxide) film, a copper foil, or the like. The electrode pattern of the transmitting conductor 14 can be formed as follows, for example. First, an electrode film formed by the above-described material or the like is formed on the first glass substrate 15 by, e.g., a sputtering method, an evaporation method, a coating method, or the like. Subsequently, the formed electrode film is etched to form the predetermined electrode pattern. The electrode pattern of the receiving conductor 12 can also be formed on the second glass substrate 17 in a similar manner. In the case of forming the transmitting conductor 14 and the receiving conductor 12 by a copper foil, it is also possible to fabricate them by spraying an ink containing copper particles onto a glass plate or the like with a predetermined electrode pattern by use of an ink-jet printer.

The spacer 16 has permeability and can be formed by, e.g., a synthetic resin such as PVB (PolyVinyl Butyral), EVA (Ethylene Vinyl Acetate), or an acrylic resin. Furthermore, it is also possible that the spacer 16 is configured by silicone rubber of a high refractive index (high dielectric constant).

In the case of forming the spacer 16 by a synthetic resin, it can be formed as follows, for example. First, a synthetic resin sheet is sandwiched between the transmitting conductors 14 and the receiving conductors 12. Subsequently, pressurizing and heating are performed while vacuuming between the conductors is performed, to form the spacer 16. Alternatively, for example, the spacer 16 may be formed by casting a synthetic resin of a liquid form between the transmitting conductors 14 and the receiving conductors 12 and thereafter solidifying the synthetic resin.

As shown in FIG. 1, the transmitting conductor group 13 is composed of the plural transmitting conductors 14 extended along a predetermined direction (X-direction in FIG. 1) and the plural transmitting conductors 14 are disposed in parallel and spaced apart from each other by a predetermined interval. Furthermore, the receiving conductor group 11 is composed of the plural receiving conductors 12 extended along a direction (Y-direction in FIG. 1) intersecting with the extending direction of the transmitting conductor 14, and the plural receiving conductors 12 are disposed in parallel and spaced apart from each other by a predetermined interval. The transmitting conductor 14 and the receiving conductor 12 can both be formed by a conductor of a straight line shape (plate shape) or a predetermined shape. In this first embodiment, an example in which they are formed into a straight line shape is shown. Although the transmitting conductor 14 and the receiving conductor 12 are so represented as to be orthogonal in this FIG. 1, an angle other than the orthogonal angle, e.g., a configuration in which the transmitting conductor 14 and the receiving conductor 12 are made to obliquely intersect, may be employed. Furthermore, in terms of the electrical characteristics, if the width of the receiving conductor is set thinner than that of the transmitting conductor, the floating capacitance is reduced and thus noise that gets mixed in with the receiving conductor can be decreased.

In this first embodiment, for example the number of transmitting conductors 14 is set to 16 and the number of receiving conductors 12 is set to 32. Furthermore, in this first embodiment, the arrangement intervals (pitches) of the transmitting conductors 14 and the receiving conductors 12 are both set to 5 mm. However, the above-described numbers of transmitting conductors 14 and receiving conductors 12 and so forth are merely an example. The present invention is not limited thereto, and the numbers and pitches of transmitting conductors 14 and receiving conductors 12 may be set depending on the size of the sensor part 10, the necessary detection accuracy, and so forth.

Furthermore, in this first embodiment, in the transmitting conductor group 13, the indexes n of the transmitting conductors 14 are set to "1" to "16" from the transmitting conductor 14 on the side closer to the reception part 30, and hereinafter the transmitting conductors 14 corresponding to the respective indexes n will be accordingly represented also as the transmitting conductors $Y_n$. Furthermore, in the present embodiment, in the receiving conductor group 11, the indexes m of the receiving conductors 12 are set to "1" to "32" from the receiving conductor 12 on the side farther from the transmission part 20, and hereinafter the receiving conductors 12 corresponding to the respective indexes m will be accordingly represented also as the receiving conductors $X_m$.

As shown in FIG. 1, the transmission part 20 includes a multi-frequency signal supply circuit 21 and a clock generating circuit 23. The multi-frequency signal supply circuit 21 is connected to the clock generating circuit 23 and generation of a multi-frequency signal is controlled by a clock signal output from the clock generating circuit 23.

Figure 3:
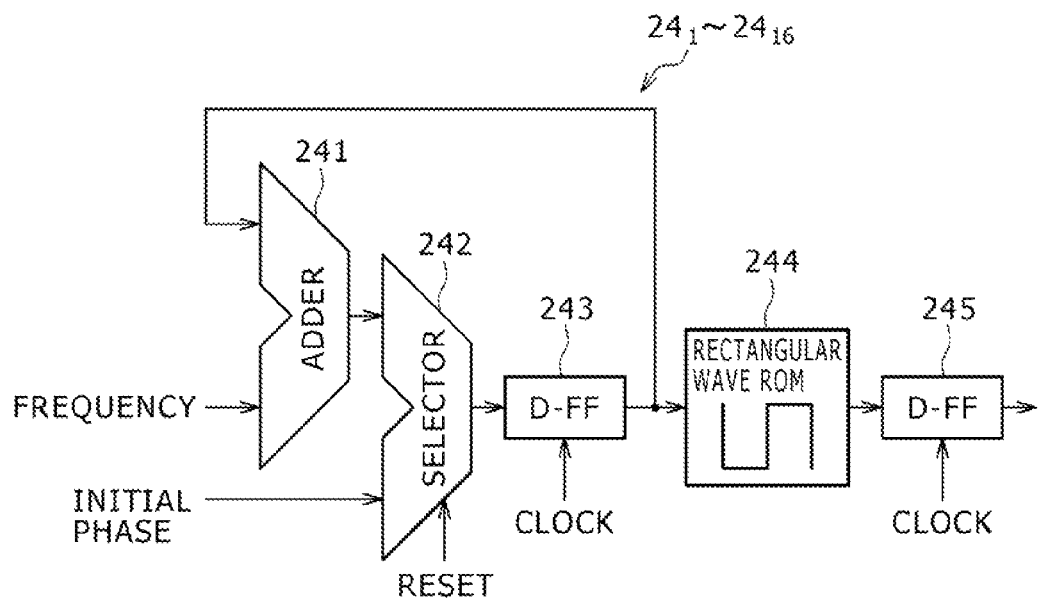
FIG. 3 is a block configuration diagram of a signal generating circuit of the indicator position detecting device according to an embodiment of the present invention.

In FIG. 3, one example of the schematic configuration of a signal generating circuit included in the multi-frequency signal supply circuit 21 is shown.

The multi-frequency signal supply circuit 21 in this first embodiment includes the signal generating circuits, the number of which corresponds to the number of frequency signals generated. For example, here it includes 16 signal generating circuits $24_1$ to $24_{16}$. The respective signal generating circuits $24_1$ to $24_{16}$ basically have the same configuration but are different in the frequency generated.

For example, in the case of supplying signals of frequencies unique to each of 16 transmitting conductors, the multi-frequency signal supply circuit 21 includes 16 signal generating circuits. Furthermore, it includes a further signal generating circuit in order to switch a frequency due to noise or the like as described later. Alternatively, in the case of providing a transmitting conductor selection circuit or a receiving conductor selection circuit as described later to thereby treat plural conductors as a block configuration, it is also possible to provide a less number of the signal generating circuits than the number of transmitting conductors.

In FIG. 3, the schematic configuration of each of the signal generating circuits $24_1$ to $24_{16}$ is shown.

Each of the circuits making up the signal generating circuits $24_1$ to $24_{16}$ is composed mainly of an adder 241, a selector 242, a D flip-flop (hereinafter, referred to as the "D-FF") 243, a rectangular wave ROM 244, and a D-FF 245. The configurations of the respective units will be described below.

The adder 241 has two input terminals and one output terminal for outputting a calculation result. To one input terminal of the adder 241, data specifying the frequency to be generated is input. This data is a digital signal specifying one frequency between 100 kHz and 250 kHz, for example, and is set for each of the signal generating circuits $24_1$ to $24_{16}$ by the control circuit 40. The calculation result output from the output terminal of this adder 241 is input to the D-FF 243 via the selector 242. The output of the D-FF 243 is input to the other input terminal of the adder 241.

The selector 242 is a selector that has two input terminals and one output terminal for outputting a calculation result. The calculation result from the above-described adder 241 is input to one input terminal of this selector 242, and data for setting the initial phase of the signal of the frequency to be generated is input to the other input terminal Furthermore, this selector 242 selectively outputs either one of the input calculation result or initial phase data. This initial phase data is a digital signal specifying, e.g., 22.5°, 45°, 90°, etc. and is set for each of the signal generating circuits $24_1$ to $24_{16}$ by the control circuit 40. In the present embodiment, the initial phase is set to 0°.

The D-FF 243 temporarily holds the data output from the selector 242. Furthermore, to this D-FF 243, the clock generated by the clock generating circuit 23 is input. Furthermore, the D-FF 243 stores the data output from the selector 242 at the timing of the edge of the clock supplied from the clock generating circuit 23. The output of the D-FF 243 is input to the rectangular wave ROM 244 and input also to the adder 241.

The rectangular wave ROM 244 is a ROM (Read Only Memory) in which, e.g., data for generating a pseudo rectangular wave of 8 bits×256 samples is stored. Each of the signal generating circuits $24_1$ to $24_{16}$ specifies the address of the rectangular wave ROM 244 and reads out data based on the clock supplied from the clock generating circuit 23 in accordance with a control signal supplied from the control circuit 40. The configuration is so made that the address to be read out is controlled in accordance with the data specifying the frequency and the data specifying the initial phase and thereby the frequency and initial phase of the pseudo rectangular wave read out from the rectangular wave ROM 244 change.

In the signal generating circuits $24_1$ to $24_{16}$ of this example, the frequency to be generated is changed by controlling the readout address of the rectangular wave ROM 244.

The D-FF 245 temporarily holds the rectangular wave data supplied from the rectangular wave ROM 244. This D-FF 245 outputs the temporarily-held rectangular wave data based on the clock supplied from the clock generating circuit 23.

When a reset signal output from the control circuit 40 is input to the selector 242, the initial phase is selected in the selector 242. Subsequently, data indicating the initial phase selected by the selector 242 is supplied to the D-FF 243, so that the initial phase is set.

Next, the D-FF 243 inputs the data indicating the initial phase to the adder 241 based on the clock generated by the clock generating circuit 23. The adder 241 executes processing of adding data corresponding to the frequency to be generated to the data indicating the initial phase, which has been input from the D-FF 243. Subsequently, this adder 241 outputs the calculation result to the D-FF 243 via the selector 242. In the D-FF 243, the value (addition value) resulting from the addition of the data of the initial phase and the data corresponding to the frequency to be generated is set. This addition value is supplied from the D-FF 243 to the rectangular wave ROM 244. Furthermore, the relevant address corresponding to the addition value is specified based on the clock generated by the clock generating circuit 23. In accordance with this address, data is read out from the rectangular wave ROM 244. The data read out from the rectangular wave ROM 244 is output to a transmitting conductor 14 via the D-FF 245. By repeating this series of operation, rectangular wave data of the desired frequency and initial phase is obtained.

The signal generating circuits $24_1$ to $24_{16}$ may be realized by a configuration in which the above-described ROM is not used, of course. Furthermore, depending on the data held in the ROM 244, not only a rectangular wave but a desired waveform such as a sine wave can be generated.

Furthermore, if the frequencies to be generated are defined as $f_1$ to $f_{16}$ and the frequency becomes higher from $f_1$ toward $f_{16}$ for example, when a lower frequency (e.g., $f_1$) is supplied to the transmitting conductor farther from the reception part 30 and a higher frequency (e.g., $f_{16}$) is supplied to the transmitting conductor closer to the reception part 30, preferred reception sensitivity can be obtained by taking into consideration the frequency characteristics of the transmission signal propagated in the receiving conductor.

As shown in FIG. 1, the reception part 30 is composed of an amplification circuit 32, an A/D (Analog to Digital) conversion circuit 33, a frequency analyzing circuit 34, and an indicator position detecting circuit 35. The amplification circuit 32, the A/D conversion circuit 33, the frequency analyzing circuit 34, and the indicator position detecting circuit 35 are disposed in that order from the side of the sensor part 10.

Figure 4:
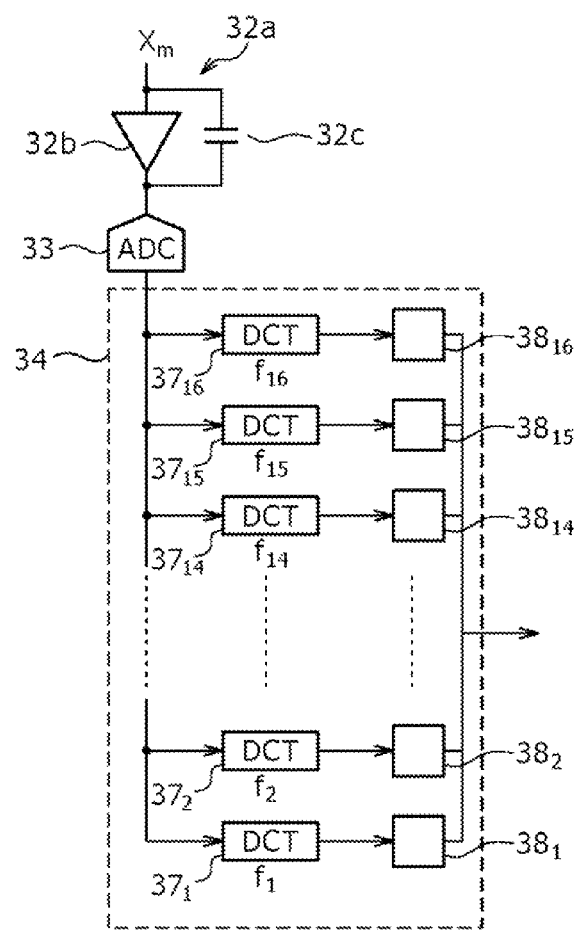
FIG. 4 is a block configuration diagram of a reception part of the indicator position detecting device according to an embodiment of the present invention.

The amplification circuit 32 converts the current signal output from the receiving conductor 12 to a voltage signal and carries out amplification. As shown in FIG. 4, this amplification circuit 32 is configured by an I/V conversion circuit 32a. The I/V conversion circuit 32a is composed of a one-input, one-output amplifier 32b (op-amp: Operational Amplifier) and a capacitor 32c connected thereto.

The A/D conversion circuit 33 converts an analog signal output from the amplification circuit 32 to a digital signal.

The frequency analyzing circuit 34 detects, from the output signal from the A/D conversion circuit 33, signals of the desired frequencies corresponding to signals of plural frequencies generated by the multi-frequency signal supply circuit 21. More specifically, this frequency analyzing circuit 34 carries out frequency analysis of the signals from the respective receiving conductors supplied from the A/D conversion circuit 33, to thereby distinguish the presence and absence of position indication by an indicator 19 at the respective cross-points between one receiving conductor and the respective intersecting transmitting conductors. Such frequency analysis is carried out for all receiving conductors to thereby identify at least one cross-point $[X_m, Y_n]$ touched by the indicator 19, and the analysis result (analysis value) is output to the indicator position detecting circuit 35 to thereby create a bitmap data corresponding to the touch by the indicator 19.

As shown in FIG. 4, this frequency analyzing circuit 34 is composed of the same number of synchronous detection circuits $37_1$ to $37_{16}$ as the number of signals simultaneously output by the multi-frequency signal supply circuit 21 (here, 16).

In the example of FIG. 1, the output of this frequency analyzing circuit 34 is supplied also to a noise analyzing circuit 41 and the reception state of the signals of the respective frequencies is analyzed. The noise analyzing circuit 41 will be described later.

In FIG. 4, the connection relationship among the I/V conversion circuit 32a making up the amplification circuit 32, the A/D conversion circuit 33, and the frequency analyzing circuit 34, and the internal configuration of the frequency analyzing circuit 34 are shown. The I/V conversion circuit 32a, the A/D conversion circuit 33, and the frequency analyzing circuit 34 are connected in series in that order from the side of the receiving conductor 12.

A current signal $X_m$ output from the receiving conductor 12 is converted to a voltage signal and amplified by the I/V conversion circuit 32a, and thereafter is input to the A/D conversion circuit 33 to be converted to a digital signal. The converted digital signal is input to the frequency analyzing circuit 34, and the existence of signals of the same frequencies as the signals of 16 kinds of frequencies output from the multi-frequency signal supply circuit 21 is detected and output.

The frequency analyzing circuit 34 is composed of the plural synchronous detection circuits $37_1$ to $37_{16}$ and plural registers $38_1$ to $38_{16}$ connected to the respective synchronous detection circuits $37_1$ to $37_{16}$. If signals of the respective frequencies ($f_1$ to $f_{16}$) corresponding to 16 transmitting conductors ($Y_1$ to $Y_{16}$) are supplied to the respective transmitting conductors 14, these transmitted signals received by one receiving conductor $X_m$ are subjected to frequency analysis for each of the frequencies ($f_1$ to $f_{16}$) by the frequency analyzing circuit 34, and the analysis result is stored in the data storage area of each of 16 registers $38_1$ to $38_{16}$.

The synchronous detection circuits $37_1$ to $37_{16}$ serve as a filter to detect the signal of the desired frequency from the input signal. The same number of synchronous detection circuits (16) as the number of signals output from the multi-frequency signal supply circuit 21 are provided, and these circuits $37_1$ to $37_{16}$ discriminate and output the signals of the respective frequencies ($f_1$ to $f_{16}$). In the example of FIG. 4, the plural synchronous detection circuits $37_1$ to $37_{16}$ are configured by a DCT (Discrete Cosine Transform).

Figure 5:
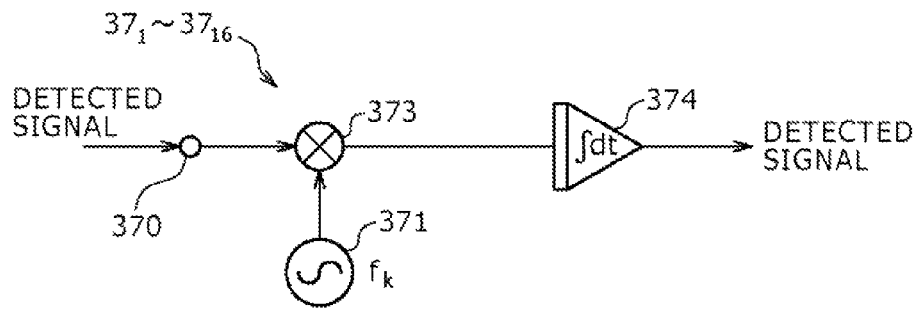
FIG. 5 is a block configuration diagram of a synchronous detection circuit part of the indicator position detecting device according to an embodiment of the present invention.

FIG. 5 is a specific configuration example of the DCT making up each of the synchronous detection circuits $37_1$ to $37_{16}$.

Each of the synchronous detection circuits $37_1$ to $37_{16}$ is composed of an input terminal 370, a signal source 371 that generates a signal of a frequency $f_k$ of the detection object (i.e., $f_k$ to be detected), a multiplier 373, and a cumulative adder 374. The signal supplied from the receiving conductor 12 to the respective synchronous detection circuits $37_1$ to $37_{16}$ via the A/D conversion circuit 33 is supplied to the multiplier 373 via the input terminal 370 and multiplied by the signal of the frequency $f_k$ from the signal source 371. Thereby, the signal of the desired frequency is detected. The signal is supplied to the cumulative adder 374 and time-integrated to be output.

In this manner, the signal of the desired frequency can be extracted by properly setting the frequency $f_k$ of the signal generated by the signal source 371 to match with the frequency that should be analyzed. A noise signal has a characteristic that a component different from the frequency $f_k$ is significantly suppressed if the output of a certain time period is accumulated. Therefore, the noise component is suppressed by using the cumulative adder 374.

It is also possible to extract the signal of the desired frequency by shifting the phase of the signal supplied to the input terminal 370 by $\pi/2$ by use of a $\pi/2$ phase shifter and multiplying it with the signal supplied to the above-described input terminal 370.

In FIG. 4, the data stored in the registers $38_1$ to $38_{16}$ is read out based on a timing signal from the control circuit 40 and supplied to the indicator position detecting circuit 35. In this manner, the indicator position detecting circuit 35 shown in FIG. 1 can distinguish the cross-point at which the signal level has changed (decreased) based on the data stored in the data storage areas of the respective registers $38_1$ to $38_{16}$, and thereby can recognize the position indicated by the indicator 19 on the sensor part 10.

The noise analyzing circuit 41 is connected to the output terminal of the frequency analyzing circuit 34 and detects a noise component included in the signal from the receiving conductor 12. Specifically, the noise analyzing circuit 41 detects the presence/absence of noise for the frequencies $f_1$ to $f_{16}$ generated by the respective signal generating circuits $24_1$ to $24_{16}$ in the multi-frequency signal supply circuit 21, and provides the detection result to the control circuit 40. For example, a period is provided during which the signals from the respective signal generating circuits $24_1$ to $24_{16}$ are inhibited, and the presence/absence of noise for the respective frequencies $f_1$ to $f_{16}$ is detected within that period.

[Principle of Position Detection: FIG. 2A, FIG. 2B, and FIG. 6A to FIG. 6C]

Next, the principle of detection of the position of an indicator in the indicator position detecting device of the present embodiment will be described with reference to the drawings. As described above, the detecting system of the present embodiment is the capacitive coupling system of the cross-point type, and the position of an indicator is detected based on a change in the state of capacitive coupling between the transmitting conductor and the receiving conductor of the sensor part.

First, with reference to FIGS. 2A and 2B, a description will be made about that the capacitive coupling state changes at each cross-point formed by the transmitting conductor 14 and the receiving conductor 12 depending on whether the indicator 19 exists on the sensor part 10. FIG. 2A shows the case in which an indicator does not exist on the sensor part 10. FIG. 2B shows the case in which an indicator exists on the sensor part 10.

In the case shown in FIG. 2A, in which an indicator does not exist on the sensor part 10, capacitive coupling is made between the transmitting conductor 14 and the receiving conductor 12 via the spacer 16, and an electric field 18 output from the transmitting conductor 14 converges on the receiving conductor 12.

Next, in the case shown in FIG. 2B, in which, e.g., a finger as the indicator 19 exists on the sensor part 10, the receiving conductor 12 enters such a state as to be grounded via the finger 19. In such a state, part of the electric field 18 output from the transmitting conductor 14 converges also on the finger 19. As a result, the electric field flowing into the receiving conductor 12 becomes small. In the capacitive coupling system, the position of the indicator 19 is detected by detecting a change in this electric field 18 (or charge) as a change in the value of the current output from the receiving conductor 12 by the reception part 30.

Next, with reference to FIG. 6A to FIG. 6C, a specific description will be made about the position detection in the case in which the finger 19 is simultaneously placed on plural cross-points of the sensor part 10.

Figure 6A:
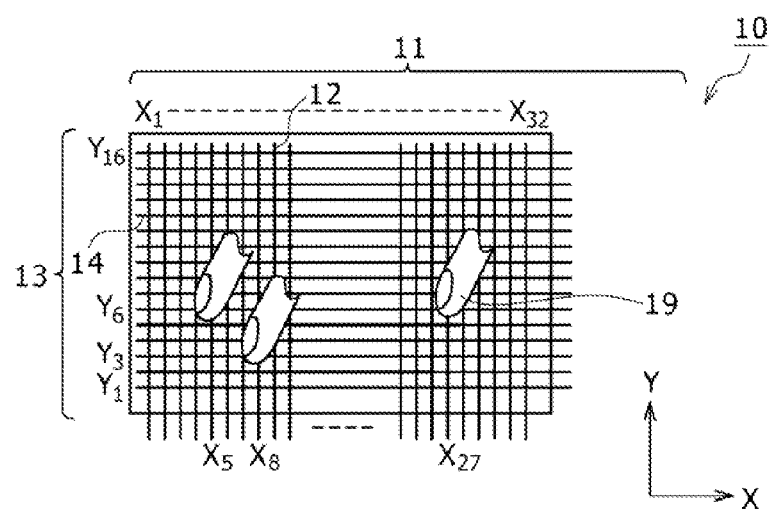
FIG. 6A is an explanatory diagram showing the state of multi-touch to an indicator position detecting device according to a first embodiment.

FIG. 6A shows the case in which the plural indicators 19 (fingers) are placed on predetermined cross-points of the sensor part 10. In FIG. 6A, two fingers 19 are placed at the cross-points between the transmitting conductor $Y_6$ and the receiving conductor $X_5$ and between the transmitting conductor $Y_6$ and the receiving conductor $X_{27}$. Furthermore, a situation in which one finger 19 is placed also at the cross-point between the transmitting conductor $Y_3$ and the receiving conductor $X_8$ is shown. FIG. 6B shows that the signal of frequency $f_6$ is supplied to the transmitting conductor $Y_6$, and based on frequency analysis by the frequency analyzing circuit 34, it is shown that a level change has occurred in the signal of frequency $f_6$ from the receiving conductor $X_5$ and the receiving conductor $X_{27}$ in response to the existence of the finger 19. Similarly, FIG. 6C shows that the signal of frequency $f_3$ is supplied to the transmitting conductor $Y_3$, and based on frequency analysis by the frequency analyzing circuit 34, it is shown that a level change has occurred in the signal of frequency $f_3$ from the receiving conductor $X_8$ in response to the existence of the finger 19.

Figure 6B:
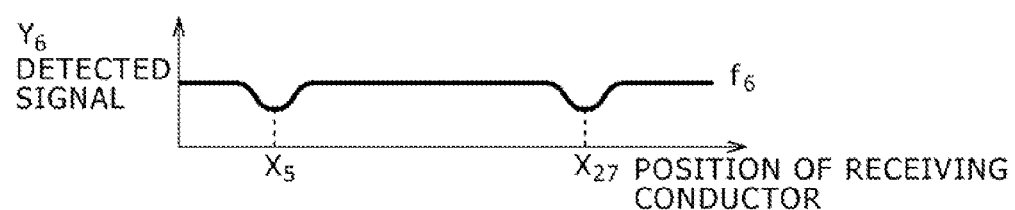
FIG. 6B is an explanatory diagram showing the waveform of output signals of receiving conductors with respect to a transmitting conductor $Y_6$.
Figure 6C:
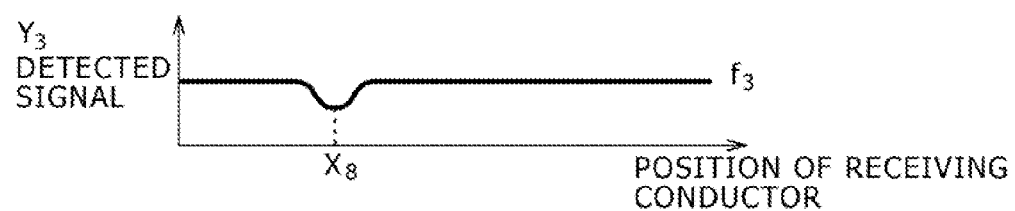
FIG. 6C is an explanatory diagram showing the detected waveform of output signals from the receiving conductors with respect to a transmitting conductor $Y_3$.

If the finger 19 does not exist on the sensor part 10, a change does not occur in the output signal from the receiving conductor 12, and thus changes in the detected signals like those shown in FIG. 6B and FIG. 6C do not occur.

Furthermore, as described above, regarding the frequencies of the transmission signals allocated to the respective transmitting conductors 14, in the case of employing a configuration in which the reception part 30 is connected not to the receiving conductor end part on the side of the transmitting conductor $Y_{16}$ but to the receiving conductor end part on the side of the transmitting conductor $Y_1$, it is preferable that the respective transmission signals ($f_{16}$ to $f_1$) be so allocated that the frequency sequentially becomes lower in the order of the transmitting conductors $Y_1, Y_2, \ldots, Y_{16}$.

As shown in FIG. 6B and FIG. 6C, by detecting the presence/absence of a level change of the signals of the respective frequencies in the respective receiving conductors by using the frequency analyzing circuit 34, whether the finger 19 exists on which cross-point can be distinguished. Thereby, the position indicated by the indicator 19 such as a finger in the sensor part 10 can be two-dimensionally detected.

The detection can be similarly carried out also when the finger 19 is placed on plural cross-points. Next, a specific description will be made about the detection operation in the case in which fingers are placed on plural cross-points existing on the same receiving conductor 12.

Specifically, in the capacitive coupling system of the cross-point type configured as described above, the position of a finger 19 can be identified by detecting the index n (1 to 16) of the transmitting conductors 14 to which signals of plural frequencies are supplied and the index m (1 to 32) of the receiving conductor 12 in which a change in the output signal is detected.

<2. First Embodiment>

Next, with reference to FIG. 7 to FIG. 10, an example of the first embodiment of the present invention will be described. The part common to the already-described indicator position detecting device 100 with the configuration of FIG. 1 and so forth is given the same symbol and description thereof is omitted. The example of the first embodiment of the present invention has characteristics in configuration and processing, to switch (change) the frequency of the signal supplied from the multi-frequency signal supply circuit 21 to the transmitting conductor 14 on the side of the transmission part 20 and to switch (change) the frequency of the signal received from the receiving conductor 12 on the side of the reception part 30.

For example, in the case of employing a configuration in which signals of 16 kinds of frequencies are simultaneously supplied to the transmitting conductors, generation of signals of 32 kinds of frequencies, which is twice 16, is allowed and 16 pairs of frequency combinations are prepared. If noise is detected, the signal of the frequency having resistance to noise, which is either one of two frequencies making up one pair of frequency combination, is selected and supplied to the transmitting conductor 14.

Suppose that, in this example, 32 signal generating circuits $24_1$ to $24_{32}$ are provided in order to generate the signals of the respective frequencies. The respective signal generating circuits $24_1$ to $24_{32}$ each generate a signal of an individual frequency. Here, the frequencies of the signals generated by the respective signal generating circuits $24_1$ to $24_{32}$ are defined as $f_1, f_2, f_3, \ldots, f_{32}$.

The plural frequencies used are divided into two, i.e. a first-half group and a second-half group, based on the values of the frequencies. Here, the frequencies $f_1, f_2, f_3, \ldots f_{16}$ are defined as the frequencies in a first group, and the frequencies $f_{17}, f_{18}, f_{19}, \ldots f_{32}$ are defined as the frequencies in a second group. The respective frequencies ($f_1$ to $f_{32}$) are so set that the frequency gradually becomes higher in that order for example, and the respective frequencies are so set as to have a predetermined frequency interval from each other.

For example, the frequencies in the first group ($f_1$ to $f_{16}$) are set with intervals of 2.5 KHz, like frequency $f_1$=100 kHz, frequency $f_2$=102.5 kHz, frequency $f_3$=105 kHz, frequency $f_{16}$=137.5 kHz. The frequencies in the second group ($f_{17}$ to $f_{32}$) are set with intervals of 2.5 kHz, like frequency $f_{17}$=140 kHz, frequency $f_{18}$=142.5 kHz, frequency $f_{32}$=177.5 kHz. This setting example of the frequency values and the frequency intervals is one example, and the values and intervals are not limited to this example. For example, it is not necessary that each group has a constant frequency interval.

The plural signal generating circuits $24_1$ to $24_{32}$ generate signals of frequencies individually set based on the control by the control circuit 40. However, as described later, if any of the plural signal generating circuits $24_1$ to $24_{32}$ is provided as a signal generating circuit that does not need to generate a transmission signal having a specific frequency, the operation thereof may be stopped.

Each of changeover switches ($27_1$ to $27_{16}$) is changeover-controlled by a control signal from the control circuit 40 so that the signal of the frequency with which the influence of noise is suppressed may be selected depending on the frequency component of noise detected by the noise analyzing circuit 41. For example, by the changeover switch $27_1$, either one of the signal of frequency $f_1$ from the signal generating circuit $24_1$ and the signal of frequency $f_{17}$ from the signal generating circuit $24_{17}$ is selectively output depending on the result of noise analysis. That is, 16 changeover switches ($27_1$ to $27_{16}$) are individually controlled and the signal of the frequency having resistance to noise is selected depending on the frequency component of the noise detected by the noise analyzing circuit 41. The signals of 16 frequencies selected by 16 changeover switches ($27_1$ to $27_{16}$) are supplied from the multi-frequency signal supply circuit 21 shown in FIG. 1 to the corresponding transmitting conductors 14.

Next, as a preferred embodiment, an example is described in which the signal generating circuit shown in FIG. 3 is used, although not illustrated in the diagram. In the signal generating circuit 24 shown in FIG. 3, the signal of the desired frequency can be generated by supplying information for specifying the frequency that should be generated to the adder 241. Therefore, 16 signal generating circuits 24 are prepared, and the signal generating circuit 24 is instructed to generate the signal of one frequency of the pair of frequencies based on a changeover signal from the control circuit 40. Due to the provision of such a configuration, the same function as that shown in FIG. 7 can be exerted by 16 signal generating circuits 24. Moreover, 16 changeover switches ($27_1$ to $27_{16}$) shown in FIG. 7 also become unnecessary.

Figure 10:
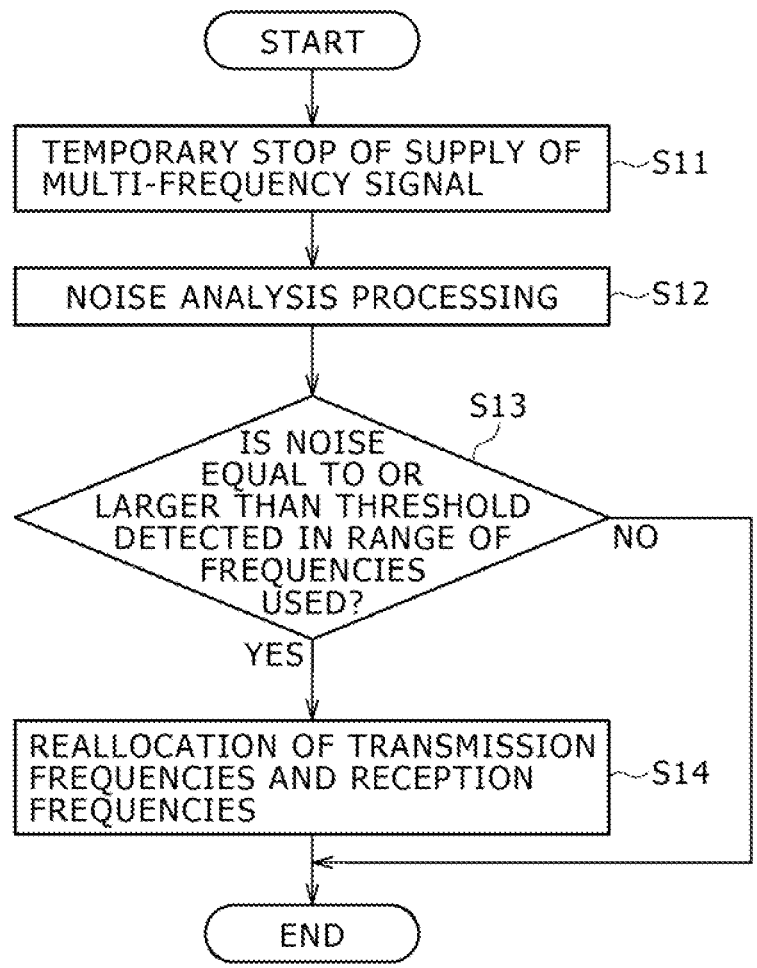
FIG. 10 is a flowchart showing the procedure of a frequency changeover (switching) in the indicator position detecting device according to the first embodiment.

Details of the frequency selection processing based on the noise analysis result by the noise analyzing circuit 41 will be described in detail by a flowchart of FIG. 10. In the configuration of FIG. 1, the noise analyzing circuit 41 detects the noise reception state from the output of the frequency analyzing circuit 34. However, it may be detected from the output signal from another circuit.

Figure 8A:
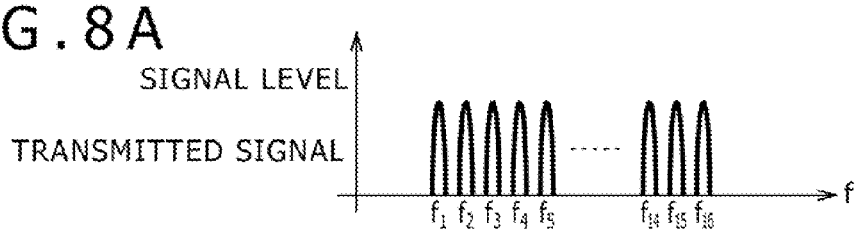
FIGS. 8A to 8C are conceptual diagrams showing a noise detection state and a changeover (switching) example of the transmission frequency in the indicator position detecting device according to the first embodiment.
Figure 8B:
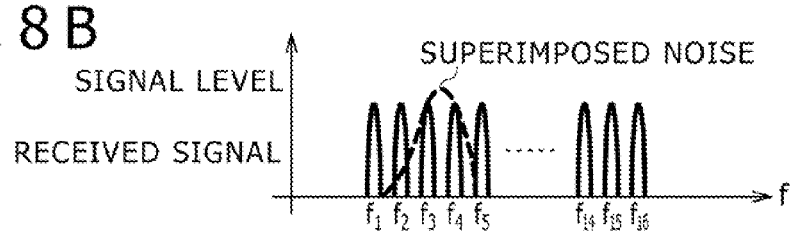
Figure 8C:
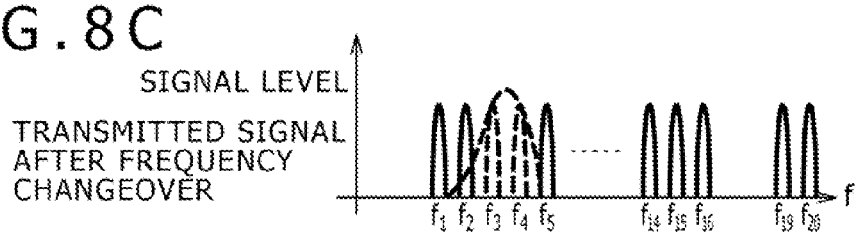

[Example of Changeover (Switching) of Frequencies: FIG. 8A to FIG. 8C]

Next, with reference to FIG. 8A to FIG. 8C, a mode in which a signal of a new frequency is allocated in response to the occurrence of noise will be described. FIG. 8A shows the state in which 16 transmission signals $f_1$ to $f_{16}$ are generated and simultaneously supplied to each of 16 transmitting conductors 14. In the example of FIG. 8A to FIG. 8C, the transmission signals $f_1$ to $f_{16}$ have certain frequency intervals.

FIG. 8B shows the state in which noise gets mixed in with a predetermined frequency area when the transmission signals $f_1$ to $f_{16}$ are received by the reception part 30. Specifically, suppose that, as shown by the dashed line in FIG. 8B, noise is superimposed on the frequency area of the frequencies $f_3$ and $f_4$ of the received signal for example. At this time, if the noise level of the frequencies $f_3$ and $f_4$ surpasses a predetermined threshold, the noise analyzing circuit 41 outputs a signal indicating that noise exists in the frequencies to the control circuit 40. The control circuit 40 controls the changeover switches $27_3$ and $27_4$ shown in FIG. 7 to make a changeover (switch) so that the frequencies $f_{19}$ and $f_{20}$ in the second group may be supplied.

Therefore, after the frequencies are switched, as shown in FIG. 8C, the frequencies $f_3$ and $f_4$, which are the frequency band with which the noise indicated by the dashed line gets mixed in, are not used for indicator position detection, but the frequencies $f_{19}$ and $f_{20}$ different from those are substituted. Based on the noise analysis result by the noise analyzing circuit 41, the control circuit 40 controls the respective changeover switches $27_1$ to $27_{16}$ in the multi-frequency signal supply circuit 21 on the transmission side and supplies a control signal for changing the frequency extracted by the frequency analyzing circuit 34 in the reception part 30. By this control, the frequency used is controlled with linkage between the transmission side and the reception side.

Figure 9:
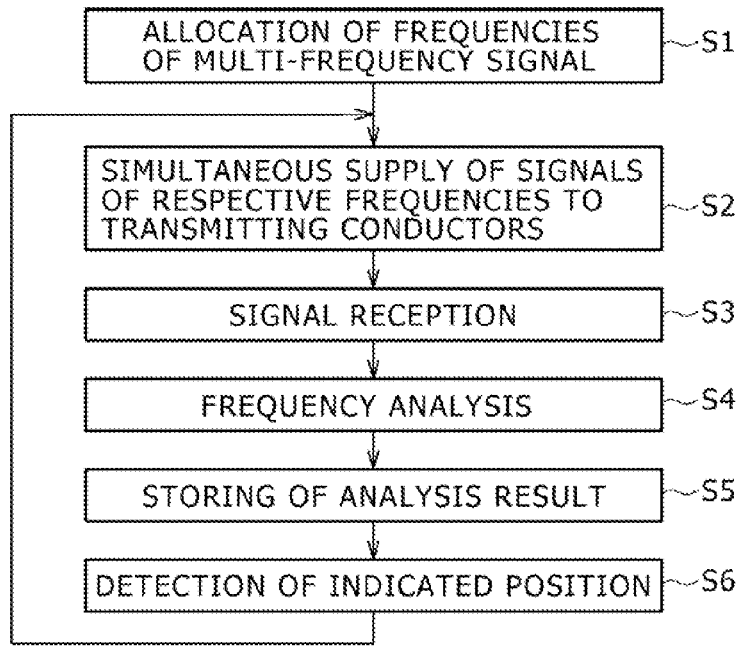
FIG. 9 is a flowchart showing the procedure of position detection in the indicator position detecting device according to the first embodiment.

[Operation of Indicator Position Detecting Device: FIG. 9]

Next, with reference to a flowchart shown in FIG. 9, the procedure of detection of an indicator in the indicator position detecting device 100 of the present embodiment will be shown. Here, suppose that the device has a configuration in which transmission signals are simultaneously supplied to all transmitting conductors and signals can be simultaneously received from all receiving conductors. A configuration having a conductor selection circuit for selecting the desired transmitting conductor or receiving conductor will be described later.

First, the multi-frequency signal supply circuit 21 generates the multi-frequency signals of the frequencies allocated by the control circuit 40 (step S1). For example, the frequencies $f_1, f_2, f_3, \ldots f_{16}$ in the first group are employed, and the signals of 16 kinds of frequencies are each simultaneously supplied from the multi-frequency signal supply circuit 21 to 16 transmitting conductors 14 (step S2).

Next, the reception part 30 receives signals from the receiving conductors 12 (step S3). Specifically, the current signal output from the receiving conductor 12 is converted to a voltage signal in the amplification circuit 32 and converted to a digital signal in the A/D conversion circuit 33. Thereafter, the signal is supplied to the frequency analyzing circuit 34.

The frequency analyzing circuit 34 carries out frequency analysis of the input signal (step S4). Specifically, for the signal received by the receiving conductor 12, the frequency analyzing circuit 34 detects the signal level of the signal having the same frequency as that supplied to the transmitting conductor 14. Furthermore, the frequency analyzing circuit 34 stores the analysis result in the register 38 (step S5).

The indicator position detecting circuit 35 detects the position indicated by the indicator 19 in the sensor part 10 from the signal supplied from the frequency analyzing circuit 34. Specifically, the signal supplied from each receiving conductor is subjected to frequency analysis by the frequency analyzing circuit 34, to thereby detect change (decrease) in the signal level of the signals of the respective transmission frequencies. Because the respective transmission frequencies are associated with the predetermined transmitting conductors 14, the position of at least one cross-point whose position is indicated by the indicator 19 is identified. In the example of the embodiment of this invention, the position indicated by the indicator 19 in the sensor part 10 is detected and calculated by identifying the respective cross-points formed by the index m (1 to 32) of the receiving conductor 12 and the index n (1 to 16) of the transmitting conductor 14 that has supplied the corresponding signal (step S6).

[Operation of Frequency Changeover (Switching) of Transmission Signal: FIG. 10]

Next, with reference to the flowchart of FIG. 10, a description will be made about processing operation of switching the frequency of the signal generated by the multi-frequency signal supply circuit 21 in order to avoid the noise frequency area. In one example, this processing is executed every time the series of process of signal detection from 32 receiving conductors disposed in the sensor part 10 is ended. Specifically, every time the frequency analysis of the signals from all receiving conductors ($X_1$ to $X_{32}$) is ended, the control circuit 40 temporarily stops the supply of the multi-frequency signals from the transmission part 20 to the transmitting conductors 14 in order to detect the presence/absence of noise (step S11). In the state in which the supply of the multi-frequency signals is stopped, the frequency analyzing circuit 34 carries out the frequency analysis of the signals from the respective receiving conductors, and the state of noise is detected by the noise analyzing circuit 41 (step S12). It is also possible to stop the operation of the multi-frequency signal supply circuit 21 when detecting the state of noise. Furthermore, in the detection of the state of noise, it is also possible to carry out the frequency analysis only on the signals from predetermined receiving conductors.

In this state, whether or not a signal equal to or larger than the predetermined threshold is detected in the respective allocated frequencies is determined (step S13).

If a signal equal to or larger than the predetermined threshold is not detected in the respective allocated frequencies, the series of frequency changeover (switching) operation is ended.

If a signal equal to or larger than the predetermined threshold is detected in the step S13, the signal of the frequency is recognized as noise.

In step S14, the changeover switch 27 corresponding to the frequency from which the existence of noise is recognized in the step S13 is controlled by the control circuit 40, and thereby a changeover (switching) to the other frequency is made. Furthermore, in linkage with the change of allocation of the transmission frequency, the frequency used in the frequency analyzing circuit 34 and the noise analyzing circuit 41 is also changed.

In this manner, the noise detection is accordingly carried out. If noise equal to or larger than the threshold is detected, processing of a changeover to another frequency is executed in order to avoid the influence of the noise.

As described above, in the indicator position detection, the frequency from which noise is detected is switched to another frequency. Thereby, even when noise comes to the indicator position detecting device from the external, a new frequency that avoids the influence of the noise is dynamically allocated, which allows for favorable indicator position detection.

<3. Second Embodiment>

Next, an example of a second embodiment of the present invention will be described with reference to FIG. 11 and FIG. 12. As the basic configuration of the indicator position detecting device 100, the configuration described with FIG. 1 to FIGS. 6A to 6C is employed. The present embodiment has characteristics in the configuration of a multi-frequency signal supply circuit 211 shown in FIG. 11 and detection thereof.

Figure 7:
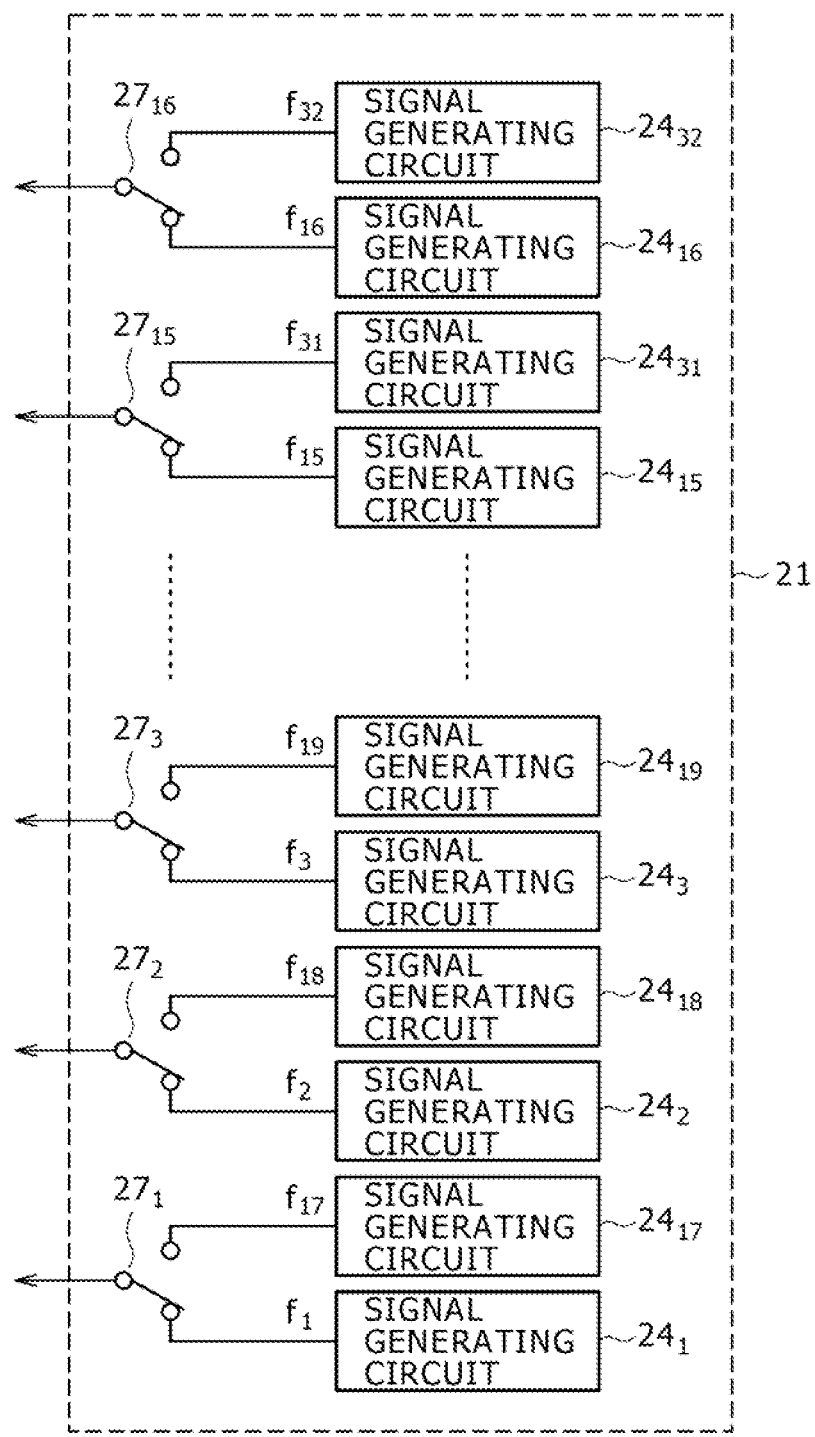
FIG. 7 is a block configuration diagram of a multi-frequency signal supply circuit of the indicator position detecting device according to the first embodiment.
Figure 11:
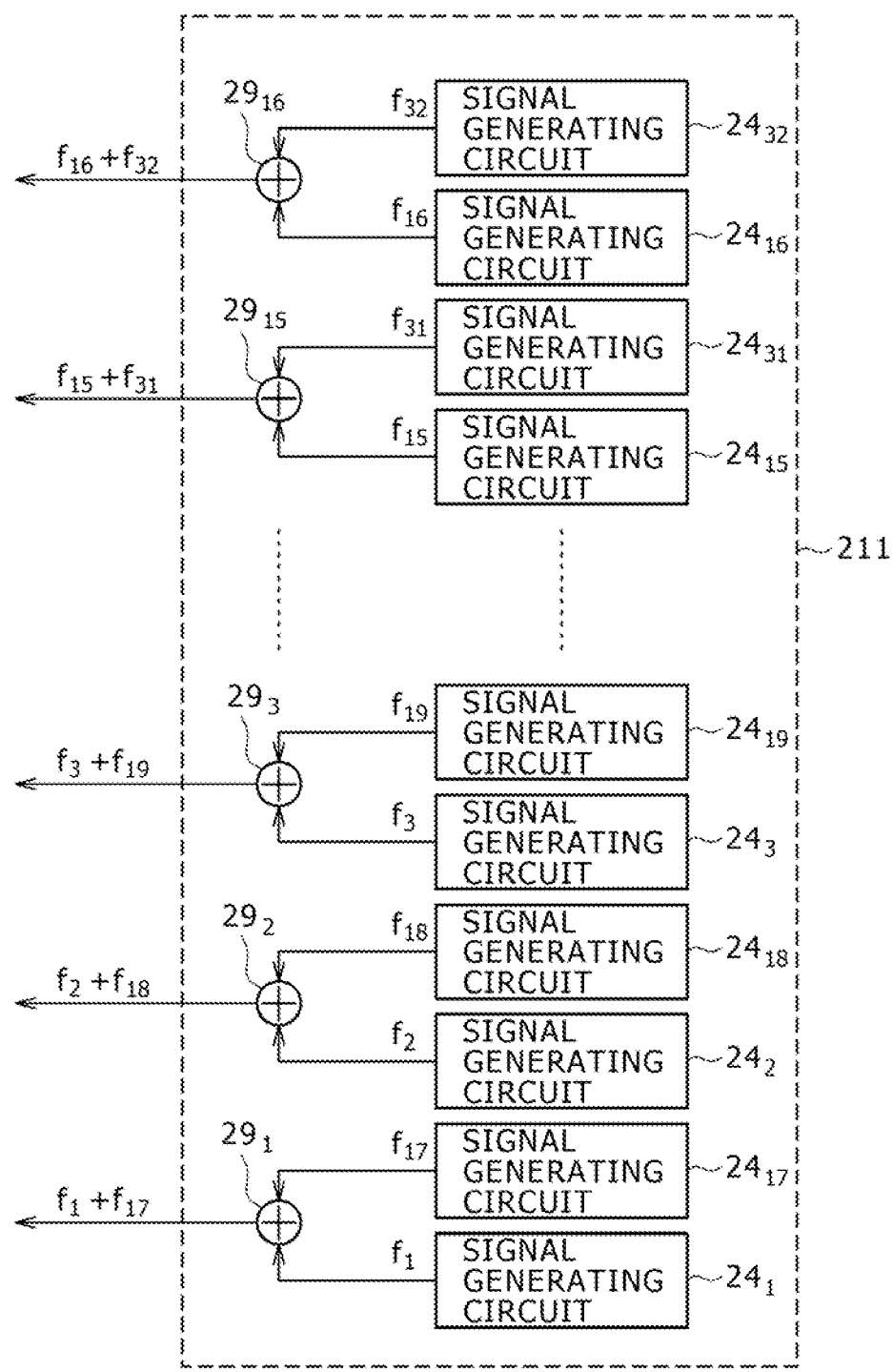
FIG. 11 is a block configuration diagram of a multi-frequency signal supply circuit of an indicator position detecting device according to a second embodiment.
Figure 12:
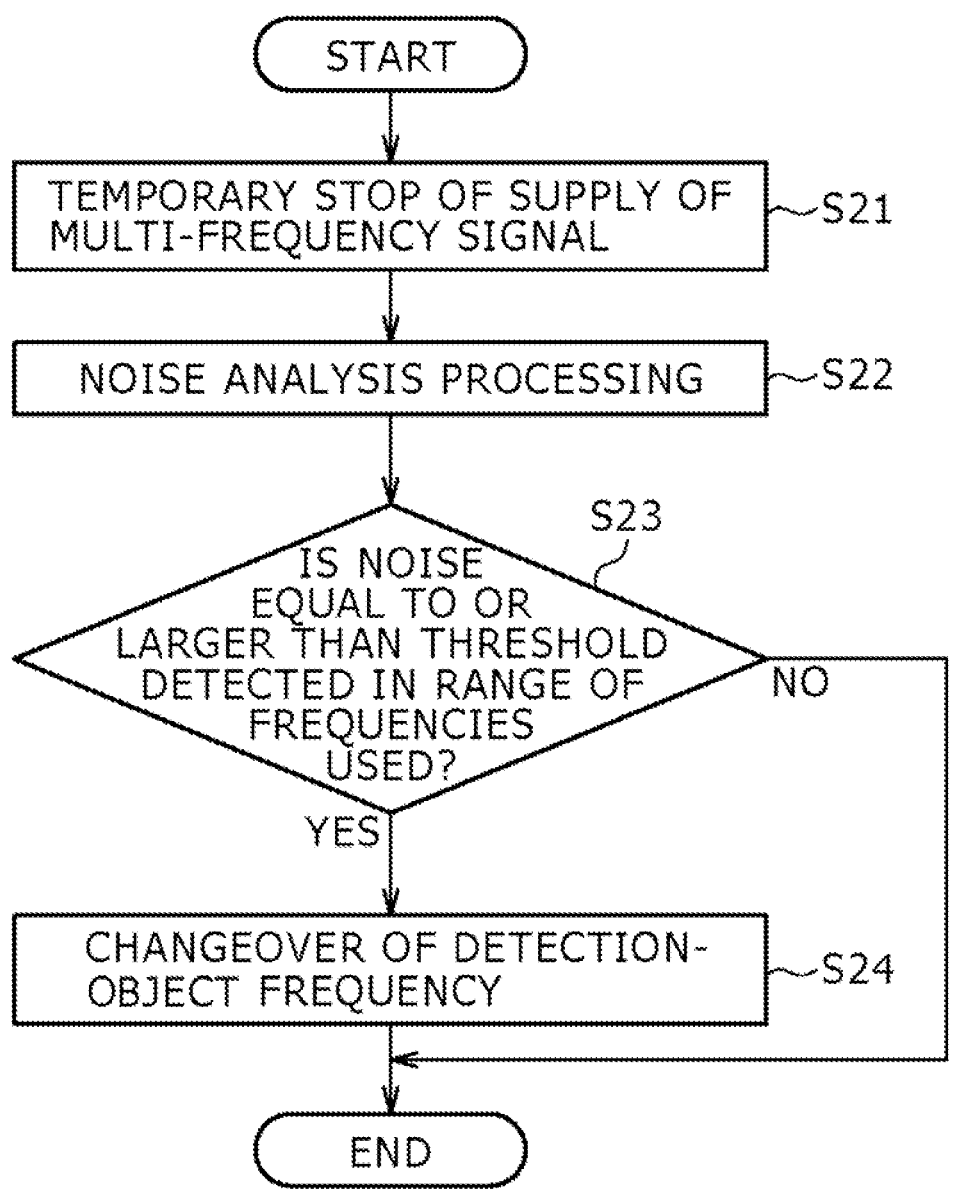
FIG. 12 is a flowchart showing the procedure of a frequency changeover (switching) in the indicator position detecting device according to the second embodiment.

In FIG. 11, the multi-frequency signal supply circuit 211 simultaneously supplies signals of plural frequencies to the respective transmitting conductors 14 making up the sensor part 10. Here, while the example of FIG. 7 is the configuration in which a signal of a frequency in the first group or a frequency in the second group is selectively supplied to each transmitting conductor, the multi-frequency signal supply circuit 211 shown in FIG. 11 has a configuration in which a signal of a frequency in the first group and a signal of a frequency in the second group are simultaneously supplied to each transmitting conductor.

The multi-frequency signal supply circuit 211 shown in FIG. 11 includes signal generating circuits $24_1$ to $24_{32}$, the number of which (32) is twice that of signals supplied to the transmitting conductors 14 (16). The respective signal generating circuits $24_1$ to $24_{32}$ each generate a signal of an individual frequency. Here, the frequencies of the signals generated by the respective signal generating circuits $24_1$, $24_2$, $24_3$, ..., $24_{32}$ are represented as $f_1$, $f_2$, $f_3$, ..., $f_{32}$. Furthermore, the frequencies are so allocated as to gradually become higher in that order.

The frequencies $f_1$, $f_2$, $f_3$, ... $f_{16}$ are defined as frequencies in a first group (lower frequency group), and the frequencies $f_{17}$, $f_{18}$, $f_{19}$, ... $f_{32}$ are defined as frequencies in a second group (higher frequency group).

Each of signals output from the signal generating circuits $24_1$, $24_2$, ..., $24_{16}$ to generate the frequencies $f_1$, $f_2$, ... $f_{16}$ in the first group and signals output from the signal generating circuits $24_{17}$, $24_{18}$, ..., $24_{32}$ to generate the frequencies $f_{17}$, $f_{18}$, ... $f_{32}$ in the second group is supplied to adders $29_1$ to $29_{16}$ to be subjected to signal addition.

Specifically, in the adder $29_1$, the signal of frequency $f_1$ in the first group and the signal of frequency $f_{17}$ in the second group are added. Thereby, a signal including frequency $f_1$ and frequency $f_{17}$ is supplied to the corresponding transmitting conductor 14. Similarly, in the adder $29_2$, the signal of frequency $f_2$ in the first group and the signal of frequency $f_{18}$ in the second group are added. Thereby, a signal including frequency $f_2$ and frequency $f_{18}$ is supplied to the corresponding transmitting conductor 14. This applies also to the other frequencies.

[Operation of Frequency Changeover (Switching) of Signal: FIG. 12]

Next, with reference to a flowchart of FIG. 12, a description will be made about processing operation of switching the detection frequency in the signal reception in the present embodiment. As described with FIG. 10, every time the frequency analysis of the signals from all receiving conductors ($X_1$ to $X_{32}$) is ended, the control circuit 40 temporarily stops the supply of the multi-frequency signals from the transmission part 20 to the transmitting conductors 14 in order to detect the presence/absence of noise (step S21). In the state in which the supply of the multi-frequency signals is stopped, the frequency analysis of the received signals is carried out by the frequency analyzing circuit 34, and the state of noise is detected by the noise analyzing circuit 41 (step S22).

In this state, it is determined whether or not a signal equal to or larger than the predetermined threshold, i.e. a noise signal, is detected in the respective allocated frequencies (step S23). If a signal equal to or larger than the predetermined threshold is not detected in the respective allocated frequencies, the series of frequency changeover (switching) operation is ended.

If a signal equal to or larger than the predetermined threshold is detected in the step S23, the signal of the frequency is recognized as noise.

In step S24, the frequency regarded as the detection object in the reception part 30 is switched to the other frequency of two frequencies.

In this manner, when the noise detection operation is carried out, if a signal equal to or larger than the threshold is detected in the respective allocated frequencies, processing of switching the allocated frequency to the other frequency is executed. Thereby, the influence of the noise is suppressed and the signals of the respective frequencies making up the received signals are favorably detected. In the case of the present embodiment, processing of a changeover of the transmission frequency is not necessary in the multi-frequency signal supply circuit 211, but all the device has to do is make a changeover of the frequency analyzed by the frequency analyzing circuit 34 in the reception part 30 and the frequency analyzed by the noise analyzing circuit 41. Thus, the control configuration is correspondingly simplified.

<4. Third Embodiment>

Next, an example of a third embodiment of the present invention will be described with reference to FIG. 13 and FIG. 14. As the basic configuration of the indicator position detecting device 100, the configuration described with FIG. 1 to FIGS. 6A to 6C is employed. The present embodiment has characteristics in the configuration of a multi-frequency signal supply circuit 221 shown in FIG. 13 and detection thereof.

Figure 13:
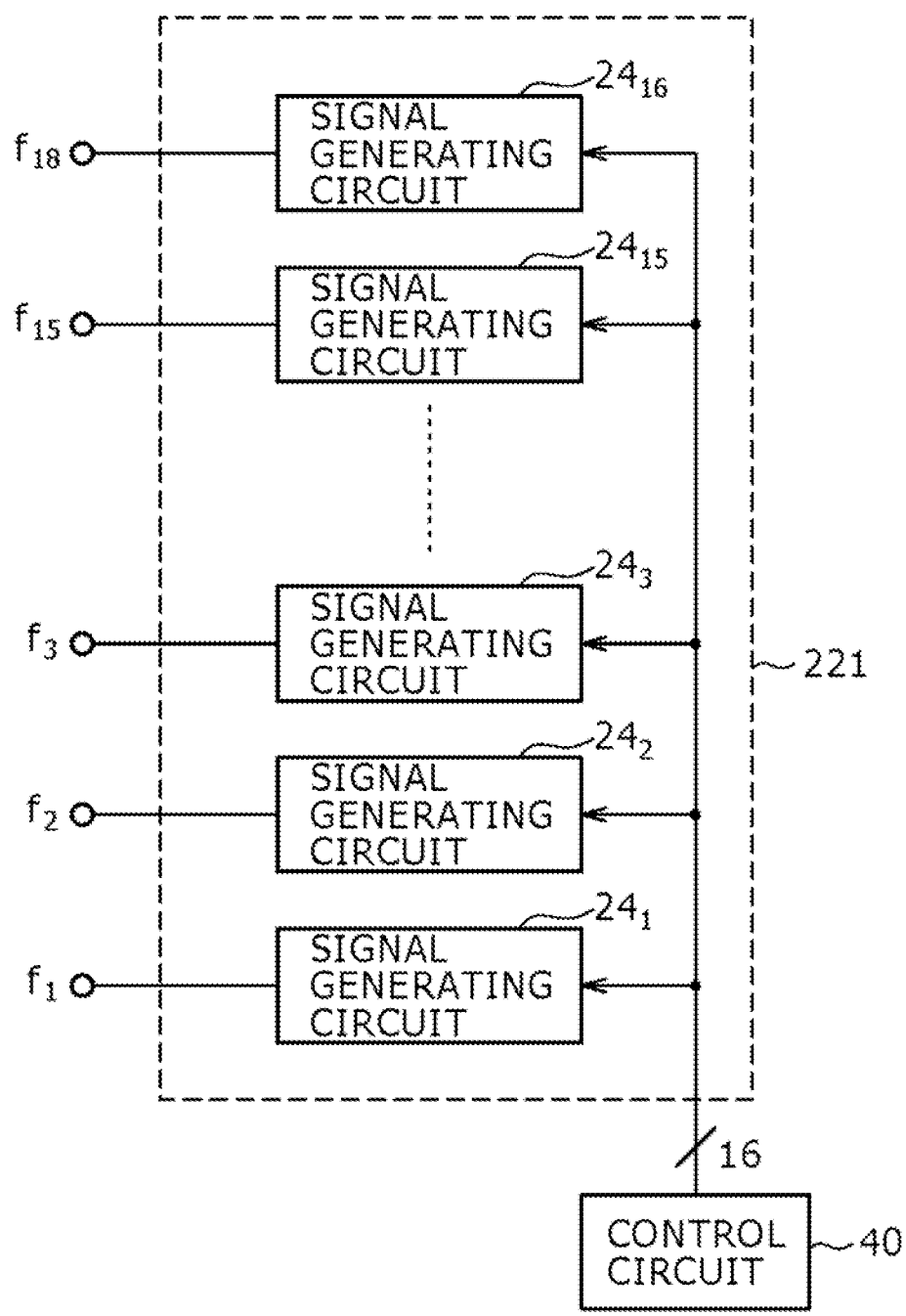
FIG. 13 is a block configuration diagram of a multi-frequency signal supply circuit of an indicator position detecting device according to a third embodiment.
Figure 14:
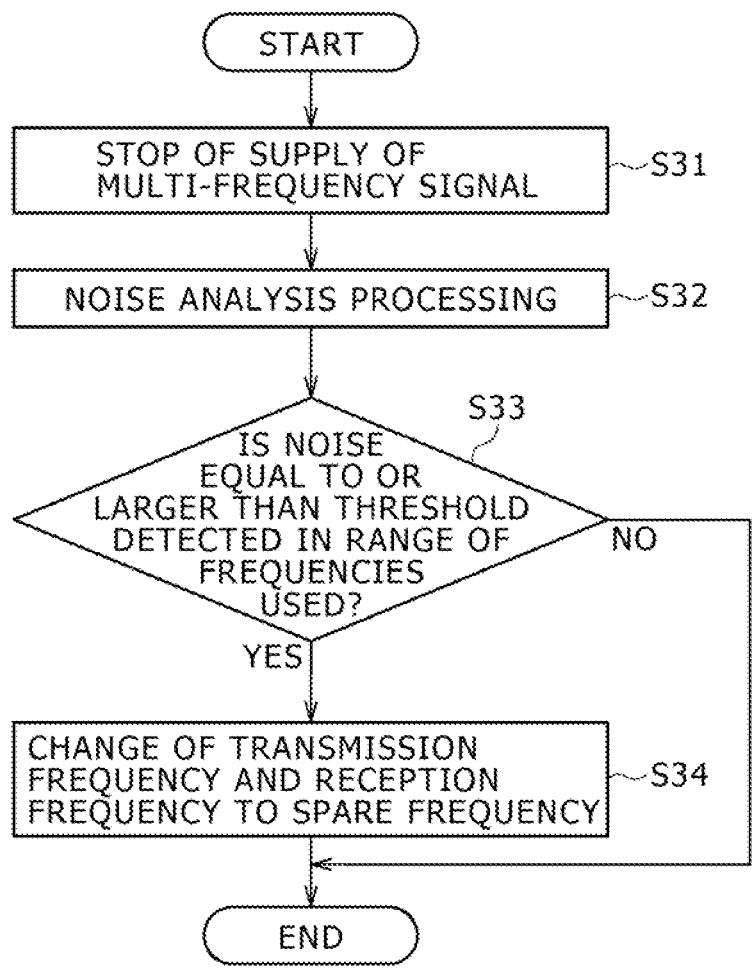
FIG. 14 is a flowchart showing the procedure of a frequency changeover (switching) in the indicator position detecting device according to the third embodiment.

The multi-frequency signal supply circuit 221 shown in FIG. 13 supplies signals of predetermined frequencies to the transmitting conductors 14 similarly to the example of FIG. 1. In FIG. 7, the configuration is shown in which the signal of a predetermined frequency is selected from a frequency in the first group and a frequency in the second group depending on the state of noise and supplied to the corresponding transmitting conductor. In the multi-frequency signal supply circuit 221 shown in FIG. 13, signals of a predetermined number of spare frequencies set in advance are selectively generated based on information on allocation of frequencies to be used, or on information instructing a frequency change, which is sent from the control circuit 40 depending on the state of noise. In this example, the configuration is so made that, besides 16 frequencies ($f_1$ to $f_{16}$) used in a situation in which noise is not detected, spare frequencies (e.g., $f_{17}$ and $f_{18}$) that can be allocated as substitutes in response to noise detection can be generated. In response to detection of noise that gives influence to the signal of frequency $f_{16}$, the frequency of the signal generated by the signal generating circuit $24_{16}$ is switched from $f_{16}$ to $f_{18}$ based on a frequency changeover signal from the control circuit 40. In this manner, the adverse effect due to noise is avoided by carrying out dynamic frequency allocation in response to the occurrence of the noise.

That is, the multi-frequency signal supply circuit 221 has a configuration capable of generating signals of a larger number of frequencies than the number of transmitting conductors 14 used. Specifically, for example, if signals of 16 kinds of frequencies are each supplied to 16 transmitting conductors 14, when the need to switch the transmission signal of a predetermined frequency to a signal of another frequency arises in order to avoid the influence of noise, signals of frequencies that are set as spare frequencies in the multi-frequency signal supply circuit 221 and different from the above-described 16 kinds of frequencies are allocated as described above. It is preferable that the number of frequencies prepared as the spare be two or more. The control circuit 40 controls the signal generating circuit to change the frequency so as to generate a signal of the frequency with which the influence of noise should be avoided, based on the noise analysis result by the noise analyzing circuit 41. The example of FIG. 13 shows that, although originally the signal of frequency $f_{16}$ is generated in the signal generating circuit $24_{16}$ and supplied to the corresponding transmitting conductor, frequency $f_{16}$ is changed to the signal of frequency $f_{18}$ that allows avoidance of the influence of noise and is different from frequency $f_{16}$ based on recognition of the noise that gives influence to the signal of frequency $f_{16}$ according to the noise analysis result by the noise analyzing circuit 41.

[Operation of Frequency Changeover (Switching) of Signal: FIG. 14]

Next, with reference to a flowchart of FIG. 14, a description will be made about the operation of processing of change of the frequency generated by the multi-frequency signal supply circuit 221 in the present embodiment. As described with FIG. 10, every time the frequency analysis of the signals from all receiving conductors ($X_1$ to $X_{32}$) is ended, the control circuit 40 temporarily stops the supply of the multi-frequency signals from the transmission part 20 to the transmitting conductors 14 in order to detect the presence/absence of noise (step S31). In the state in which the supply of the multi-frequency signals is stopped, the frequency analysis of the received signals is carried out by the frequency analyzing circuit 34, and noise detection is carried out by the noise analyzing circuit 41 (step S32).

In this state, it is determined whether or not a signal equal to or larger than the predetermined threshold is detected in the respective allocated frequencies (step S33). If a signal equal to or larger than the predetermined threshold is not detected in the respective allocated frequencies in the step S33, the series of frequency changeover operation is ended.

In the step S33, if a signal equal to or larger than the predetermined threshold is detected, the signal of the frequency is recognized as noise.

In step S34, the control circuit 40 instructs the signal generating circuit $24_{16}$, which generates the signal of frequency $f_{16}$ affected by noise, to change the frequency generated to frequency $f_{18}$, which allows avoidance of the influence of the noise and is set as a spare for noise avoidance.

In this manner, when the noise detection operation is carried out, if a signal equal to or larger than the threshold is detected in the respective allocated frequencies, processing of switching the allocated frequency to a spare frequency is executed. Thereby, the influence of noise is suppressed and the signals of the respective frequencies making up the received signals are favorably detected.

<5. Description of Modification Example 1>

Next, a modification example (modification example 1) applied to the respective embodiments of the present invention will be described with reference to FIG. 15.

The configuration described with FIG. 1 and so forth includes the configuration in which signals of frequencies, the number of which corresponds to the number of transmitting conductors 14 used, are generated by the multi-frequency signal supply circuit 21 and supplied to the respective transmitting conductors 14. In this modification, the transmitting conductors 14 are divided into plural blocks and the respective blocks are switched in a time-division manner to thereby expand the number of transmitting conductors 14.

Figure 15:
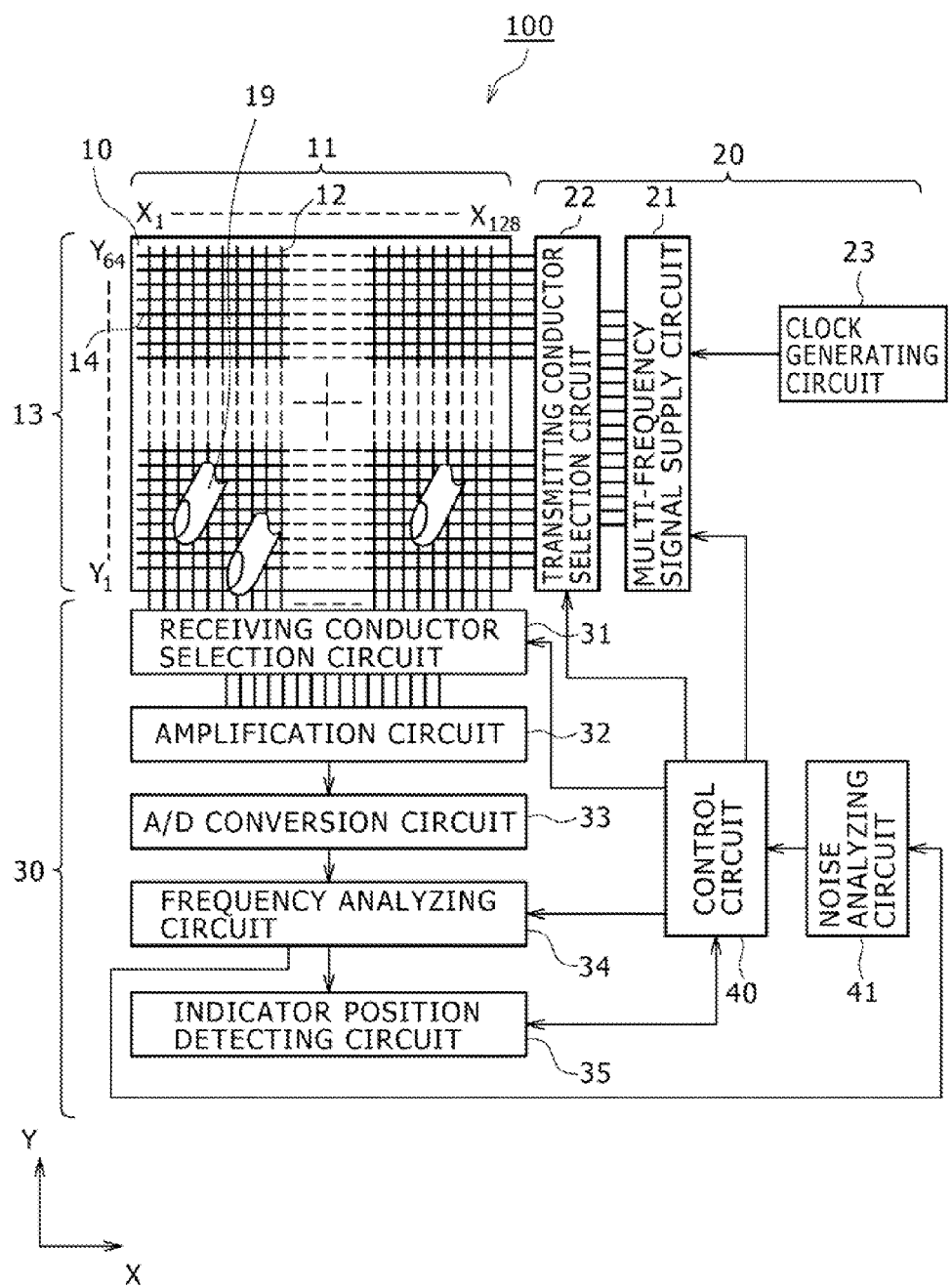
FIG. 15 is a schematic block configuration diagram of an indicator position detecting device according to modification example 1 of an embodiment of the present invention.

In FIG. 15, a transmitting conductor selection circuit 22 and a receiving conductor selection circuit 31 are newly provided compared with FIG. 1. The other configurations are the same as before, and thus are given the same symbols and description thereof is omitted.

The transmitting conductor selection circuit 22 provided in the transmission part 20 segments the transmitting conductor group 13 into a predetermined number of blocks, and sequentially selects the respective blocks to simultaneously supply signals of the respective frequencies generated by the multi-frequency signal supply circuit to the transmitting conductors 14 making up each of the blocks. This conductor selection control is carried out based on a control signal from the control circuit 40. Suppose that, in this example, 64 transmitting conductors 14 and 128 receiving conductors are disposed in the sensor part 10 and signals of 16 kinds of frequencies can be generated in the multi-frequency signal supply circuit 21. The transmitting conductor selection circuit 22 segments 64 transmitting conductors 14 into four blocks, where one block is composed of 16 transmitting conductors 14, and sequentially switches the respective blocks to simultaneously supply the signals of 16 kinds of frequencies to 16 transmitting conductors 14 making up each of the blocks. Employing such a configuration enables handling of up to the same number of transmitting conductors as the multiplication value of the number of frequencies generated by the multi-frequency signal supply circuit and the number of blocks, and allows for using a large sensor size.

The receiving conductor selection circuit 31 is provided also in the reception part 30 and segments the receiving conductors 12 into plural blocks based on a control signal from the control circuit 40 similarly to the function of the transmitting conductor selection circuit 22. Each block is composed of a predetermined number of receiving conductors 12, and signals from the receiving conductors 12 of the respective blocks are connected to the amplification circuit 32 via the receiving conductor selection circuit 31. The respective blocks are sequentially switched. In this example, if the sensor part 10 is composed of 128 receiving conductors 12 and the reception part 30 can simultaneously detect signals of 16 kinds of frequencies, the receiving conductor selection circuit 31 segments 128 receiving conductors 12 into eight blocks, where one block is composed of 16 receiving conductors 12, and simultaneously connects 16 receiving conductors 12 to the amplification circuit 32, while sequentially switching (changing-over) the respective blocks. By employing such a configuration, the reception part 30 can be operated in a time-division manner similarly to the configuration of the transmission part 20. This enables handling of up to the same number of receiving conductors as the multiplication value of the number of frequencies that can be simultaneously detected by the reception part 30 and the number of blocks, and allows for using a large sensor size.

<6. Description of Modification Example 2>

Figure 16:
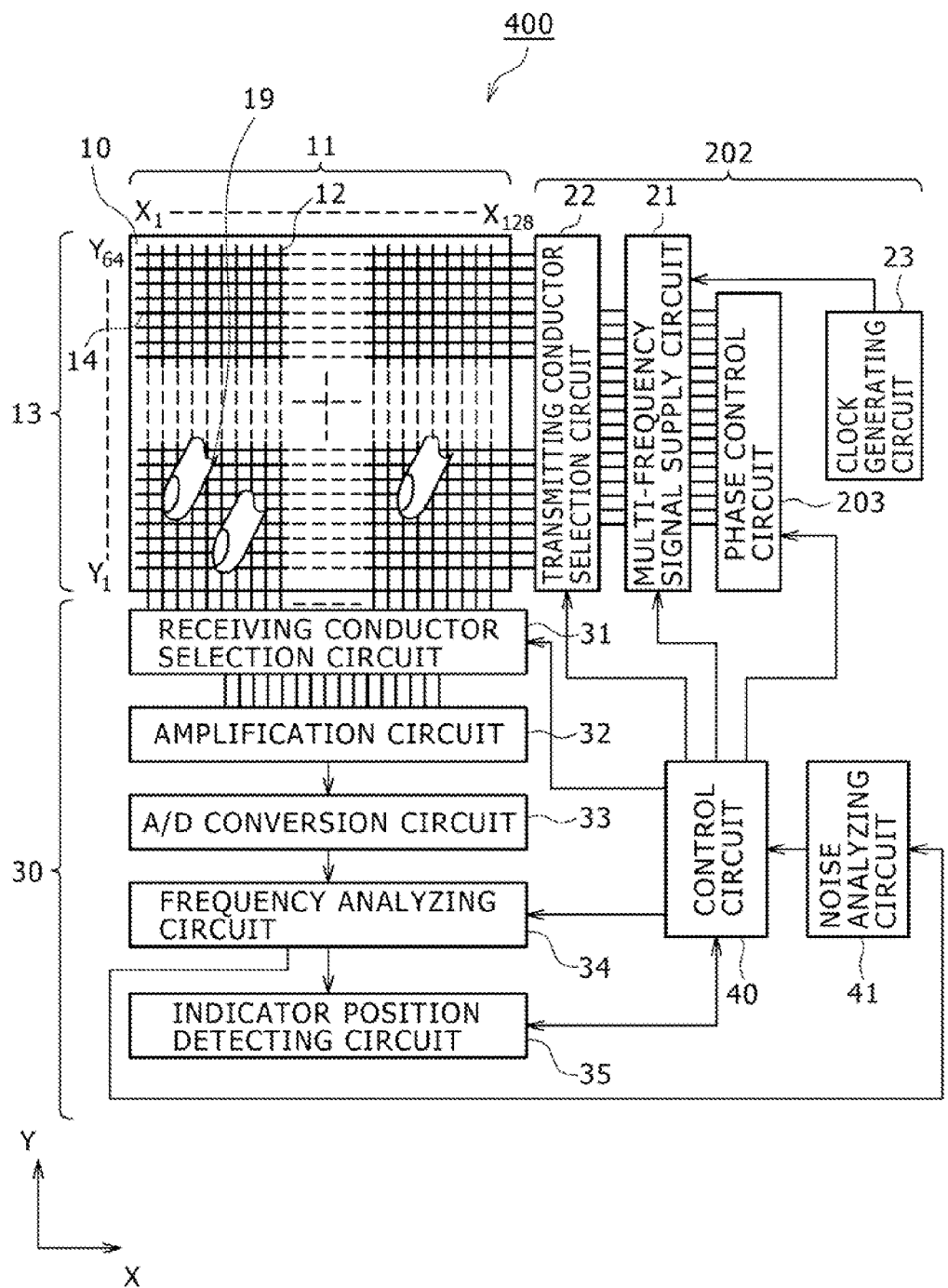
FIG. 16 is a schematic block configuration diagram of an indicator position detecting device according to modification example 2 of an embodiment of the present invention.
Figure 17A:
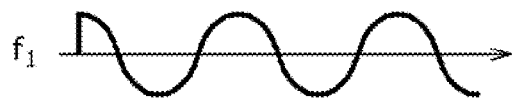
FIG. 17A to FIG. 17D are explanatory diagrams showing a dispersion example of the initial phase of a multi-frequency signal of modification example 2.
Figure 17B:
Figure 17C:
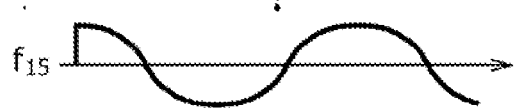
Figure 17D:

Next, a modification example (modification example 2) applied to the respective embodiments of the present invention will be described with reference to FIG. 16 to FIG. 19. Modification example 2 has characteristics in controlling the relative phases of signals simultaneously generated from the multi-frequency signal supply circuit 21. For this purpose, as shown in FIG. 16, in a transmission part 202 making up an indicator position detecting device 400, the phases of signals of the respective frequencies generated by the respective signal generating circuits $24_1$ to $24_{16}$ in the multi-frequency signal supply circuit 21 are controlled by a phase control circuit 203. The other configurations are the same configurations as those in the already-described indicator position detecting device 200. Thus, they are given the same symbols and description thereof is omitted. The phase of each signal is controlled by the phase control circuit 203 based on an instruction from the control circuit 40. The signals of the respective frequencies generated by the multi-frequency signal supply circuit are supplied to the corresponding transmitting conductors 14, and the respective receiving conductors 12 simultaneously receive the signals of the plural frequencies. Therefore, if combining of the respective transmission signals causes the signal level thereof to become a value equal to or larger than a previously assumed value, possibly the signal level surpasses the allowable value (dynamic range) of the input signal level of the amplification circuit 32. Thus, the phases of the transmission signals are controlled so that the signal level of the combined signal received by the respective receiving conductors 12, when plural transmission signals are combined and received by the respective receiving conductors 12, is prevented from becoming equal to or larger than a predetermined value.

FIG. 17A to FIG. 17D show one example of the phase control of the transmission signals. Due to an instruction from the control circuit 40, signals of the respective frequencies are generated by the signal generating circuits $24_1$ to $24_{16}$ in the multi-frequency signal supply circuit 21 and are each supplied to the transmitting conductors 14 corresponding to 16 selected transmitting conductors. This example includes a configuration in which the transmission signals whose frequencies lie close to each other are sequentially paired, like frequencies $f_1$ and $f_2$, $f_3$ and $f_4$, ..., $f_{15}$ and $f_{16}$, and the phase of one transmission signal of the pair ($f_2$, $f_4$, ..., $f_{16}$) is inverted to supply the resulting signal to the corresponding transmitting conductor 14. In order to properly control the maximum signal level of the signal resulting from combining of plural transmission signals, it is preferable to perform calculation by simulation by using the values of the respective frequencies used as the transmission signals and the phases of the respective transmission signals as main parameters.

Furthermore, in the configuration of FIG. 16, the control circuit 40 operates in such a manner as to properly control the gain of the received signal (hereinafter, referred to as the "reception gain") based on the signal level of the signal received from the sensor part 10.

Figure 18:
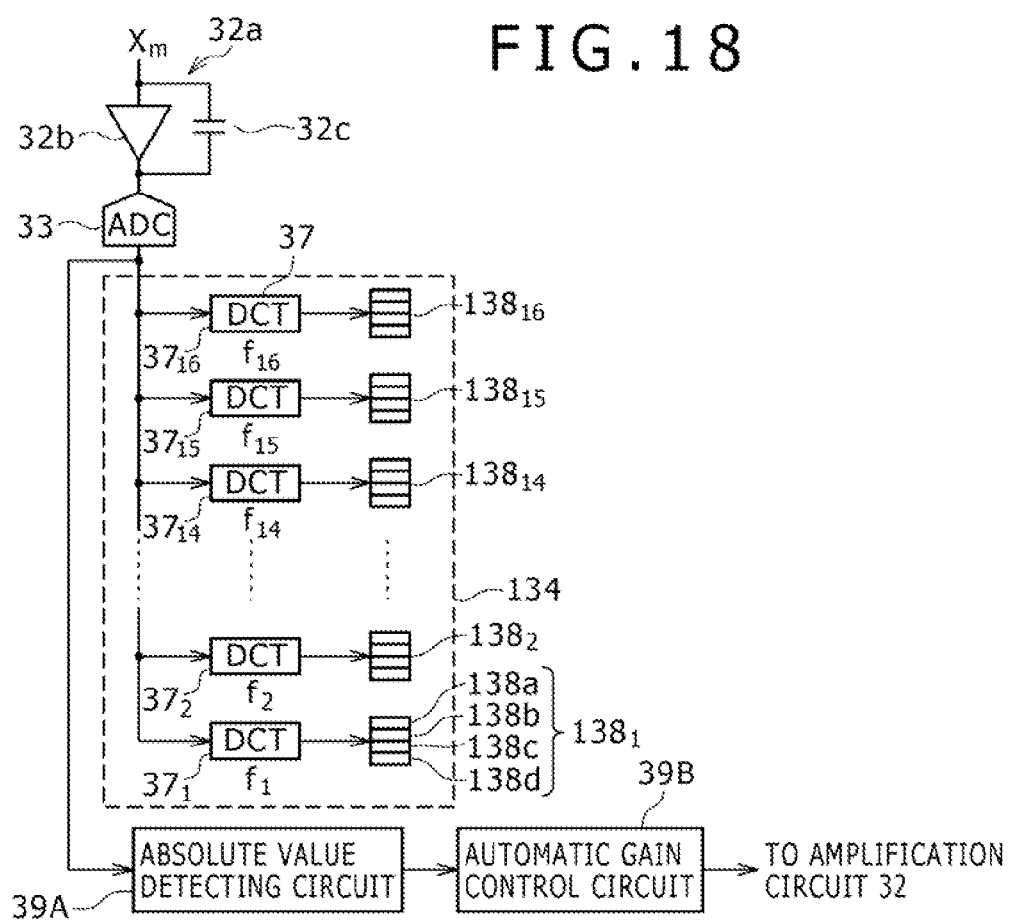
FIG. 18 is a block configuration diagram of a reception part of the indicator position detecting device according to modification example 2.
Figure 19:
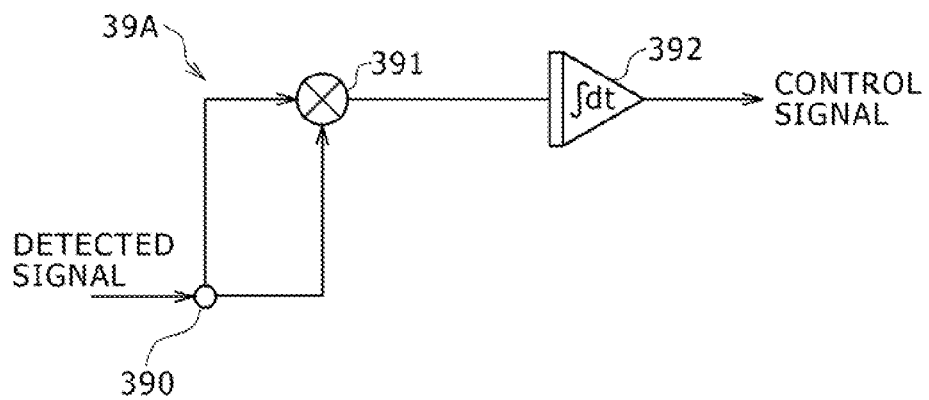
FIG. 19 is a block configuration diagram of an absolute value detecting circuit of the indicator position detecting device of modification example 2.
Figure 20:
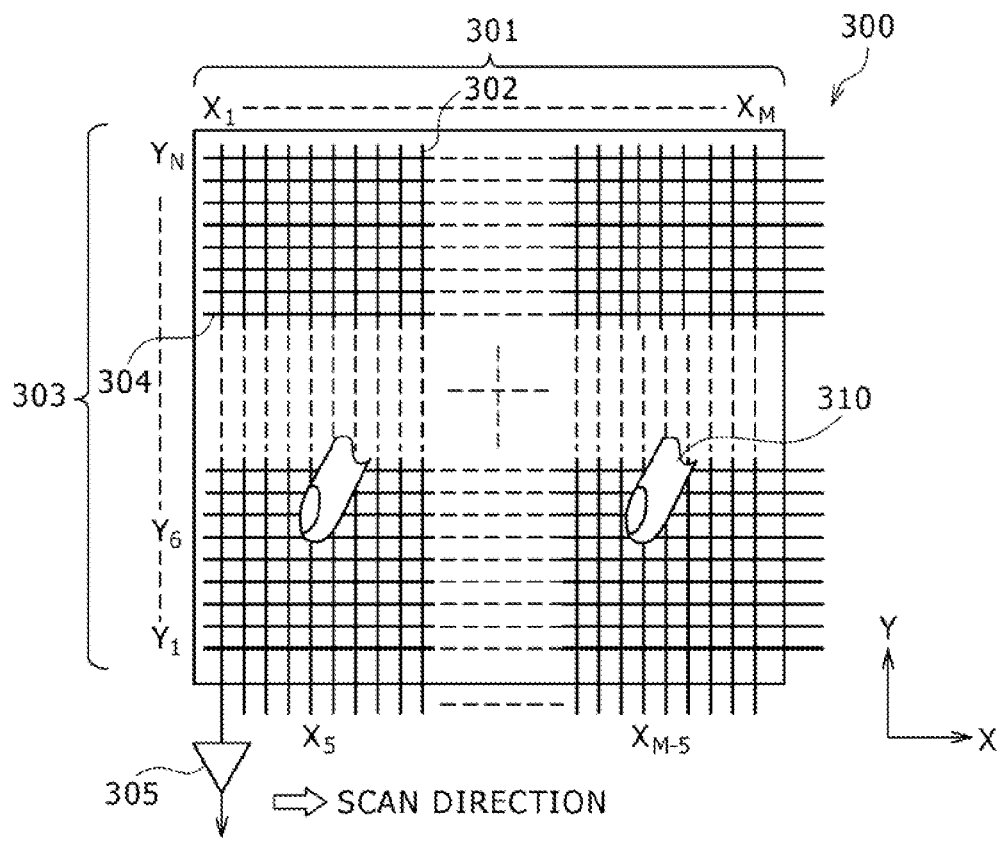
FIG. 20 is a schematic configuration diagram of a sensor part of a conventional indicator position detecting device of the capacitive coupling system of the cross-point type.

FIG. 18 and FIG. 19 show a specific example of gain control. FIG. 18 has a circuit configuration that is suitable to be applied to the indicator position detecting device, in which the transmitting conductor selection circuit 22 or the receiving conductor selection circuit 31 is disposed as shown in FIG. 15 and FIG. 16. Specifically, in the circuit configuration shown in FIG. 18, compared with the frequency analyzing circuit 34 shown in FIG. 4, plural registers $138_1$ to $138_{16}$ each having plural data storage areas corresponding to the number of transmission blocks, an absolute value detecting circuit 39A, and an automatic gain control circuit 39B are newly provided. The other configurations are the same as before, are given the same symbols and description thereof is omitted. A frequency analyzing circuit 134 is composed of plural synchronous detection circuits $37_1$ to $37_{16}$ and the plural registers $138_1$ to $138_{16}$ connected to the respective synchronous detection circuits $37_1$ to $37_{16}$. Each of the registers $138_1$ to $138_{16}$ includes areas 138a to 138d, the number of which is four in the example of FIG. 15 and FIG. 16, corresponding to the number of transmission blocks formed by the transmitting conductor selection circuit 22. That is, each of the areas 138a to 138d corresponds to the number of transmitting conductors forming each transmission block. Specifically, the case is assumed in which 64 transmitting conductors ($Y_1$ to $Y_{64}$) are divided into four blocks by the transmitting conductor selection circuit 22 and 16 kinds of transmission signals having the frequencies ($f_1$ to $f_{16}$) different from each other are simultaneously supplied to each of 16 transmitting conductors making up each of the blocks through sequential selection of the respective blocks.

If a first transmission block including 16 transmitting conductors ($Y_1$ to $Y_{16}$) is selected by the transmitting conductor selection circuit 22 and signals of the respective frequencies are supplied to the transmitting conductors, these transmitted signals received by one receiving conductor $X_m$ are subjected to frequency analysis by the frequency analyzing circuit 134 for each of the frequencies ($f_1$ to $f_{16}$), and the analysis result is stored as data in the area 138a of each of 16 registers $138_1$ to $138_{16}$. Next, if a second transmission block including 16 transmitting conductors ($Y_{17}$ to $Y_{32}$) is selected by the transmitting conductor selection circuit 22, the analysis result is stored as data in the area 138b of each of 16 registers $138_1$ to $138_{16}$. Similarly, when a third transmission block and a fourth transmission block are selected, the analysis result is stored in the area 138c and the area 138d, respectively.

Furthermore, the signal from the receiving conductor 12 is supplied to the absolute value detecting circuit 39A via the A/D conversion circuit 33. The absolute value detecting circuit 39A detects the signal level for all frequency components, of the signal from the receiving conductor 12, and controls the amplification circuit 32 via the automatic gain control circuit 39B to thereby carry out automatic gain control (AGC) for the signal from the receiving conductor 12.

FIG. 19 shows a configuration example of the absolute value detecting circuit 39A. The absolute value detecting circuit 39A includes an input terminal 390, a multiplier 391 that performs calculation of squaring the signal level of the input signal, and a cumulative adder 392 that integrates (cumulatively adds) the output of this multiplier 391. When a signal is input from the receiving conductor 12 to the absolute value detecting circuit 39A via the A/D conversion circuit 33, this signal is branched at the input terminal 390 and supplied to the multiplier 391. Squaring operation is performed in the multiplier 391 and cumulative addition is performed in the cumulative adder 392. The cumulative addition result is supplied to the automatic gain control circuit 39B.

The absolute value detecting circuit 39A shown in FIG. 18 is not limited to the above-described configuration. Any method is available as long as the signal level of the whole of the supplied signal can be detected in the area of the frequencies used (e.g., frequencies $f_1$ to $f_{16}$). Furthermore, the absolute value detection processing may be by either digital signal processing means or analog circuit means. If the signal level of all frequency components detected is not proper, i.e. the signal level is too high or too low, the gain of the amplification circuit 32 is controlled and thereby the signal level is maintained in a proper range. Alternatively, it is also possible to carry out control so that the signal level of the received signal may become proper, by instructing the respective signal generating circuits (e.g., signal generating circuits $24_1$ to $24_{16}$) to control the transmission signal level.

Because the device has a configuration in which the reception gain is controlled based on the signal resulting from absolute value detection of the signal from the receiving conductor 12, i.e., the signal level in the whole of the area of the frequencies used, the reception gain can be properly controlled based on the signal level of the whole of the received signals of plural frequencies including noise.

The invention claimed is:
1. An indicator position detecting device, comprising:
a conductor pattern that is composed of a plurality of conductors disposed along a first direction and a plurality of conductors disposed along a second direction intersecting with the first direction, the conductor pattern being configured to detect position indication by an indicator;
a multi-frequency signal supply circuit configured to supply N number of transmission signals at N different frequencies, respectively, selected from M number of different frequencies, to the plurality of conductors disposed along the first direction, where N and M are integers and M is greater than or equal to N;
a frequency analyzing circuit configured to be supplied with reception signals from the plurality of conductors disposed along the second direction and to carry out frequency analysis of each of the reception signals for N number of frequency components corresponding to said N number of transmission signals at N different frequencies;

an indicated-position detecting circuit configured to receive a result of the frequency analysis from the frequency analyzing circuit and to detect position indication by the indicator based on the received result of the frequency analysis;

a noise analyzing circuit configured to detect noise components in the reception signals at the N different frequencies; and a control circuit configured to determine, based on the noise components detected by the noise analyzing circuit, whether the same set of the N different frequencies is to be supplied next or not from the multi-frequency signal supply circuit to the plurality of conductors disposed along the first direction.

2. The indicator position detecting device according to claim 1, further comprising a transmitting conductor selection circuit configured to group the plurality of conductors disposed along the first direction into a plurality of blocks, to switch between the respective blocks in a time-division manner, and to supply the N number of transmission signals at N different frequencies to those conductors that make up each block.

3. The indicator position detecting device according to claim 1, further comprising a receiving conductor selection circuit configured to group the plurality of conductors disposed along the second direction into a plurality of blocks, to switch between the respective blocks in a time-division manner, and to supply the reception signals from those conductors that make up each block to the frequency analyzing circuit.

4. The indicator position detecting device according to claim 1, wherein the noise analyzing circuit is configured to detect noise components in the reception signals at the N different frequencies in a period during which supply of the transmission signals to the plurality of conductors disposed along the first direction is suspended.

5. The indicator position detecting device according to claim 1, wherein the noise analyzing circuit is configured to detect a noise component at each of the N different frequencies.

6. The indicator position detecting device according to claim 1, further comprising an amplification circuit configured to amplify the reception signals from the conductors disposed along the second direction, wherein reception levels with respect to all of the N number of frequency components included in the reception signals are obtained, and amplification control of the amplification circuit is carried out according to the reception levels.

7. The indicator position detecting device according to claim 1, wherein signal levels of the N number of transmission signals generated in the multi-frequency signal supply circuit are controlled based on reception levels of the reception signals from the conductors disposed along the second direction.

8. The indicator position detecting device according to claim 1, further comprising a phase control circuit configured to control the relative phases of the N number of transmission signals supplied to the plurality of conductors disposed along the first direction.

9. The indicator position detecting device according to claim 1, wherein M=2N and the M number of different frequencies are divided into a first group and a second group each containing N number of different frequencies, and the control circuit is configured to instruct, based on the noise components detected by the noise analyzing circuit, the multi-frequency signal supply circuit to supply the N number of transmission signals at N different frequencies in the first group or at N different frequencies in the second group.

10. The indicator position detecting device according to claim 1, wherein the multi-frequency signal supply circuit is further configured to generate a transmission signal at a spare frequency, and the control circuit is configured to instruct, based on the noise components detected by the noise analyzing circuit, the multi-frequency signal supply circuit to change one of the N different frequencies from a noisy frequency to the spare frequency.

11. The indicator position detecting device according to claim 10, wherein the control circuit is configured to notify the frequency analyzing circuit of a change from the noisy frequency to the spare frequency, such that the frequency analyzing circuit analyzes the spare frequency instead of the noisy frequency.

12. The indicator position detecting device according to claim 1, wherein the control circuit is configured to control, based on the noise components detected by the noise analyzing circuit, selection of the N different frequencies from the M different frequencies of the transmission signals supplied from the multi-frequency signal supply circuit and selection of the N different frequencies from the M different frequencies analyzed by the frequency analyzing circuit.

13. The indicator position detecting device according to claim 1, wherein a transmission signal at a higher frequency among the N number of transmission signals at N different frequencies generated by the multi-frequency signal supply circuit is supplied to a conductor disposed along the first direction, which is closer to the frequency analyzing circuit than the rest of the conductors disposed along the first direction.

14. A position detecting method executed in a processor, the processor being utilized with a conductor pattern having a plurality of transmitting conductors extending in a direction and a plurality of receiving conductors extending in another direction, the method comprising:

supplying N number of transmission signals at N different frequencies, respectively, selected from M number of different frequencies, to the plurality of transmitting conductors, where N and M are integers and M is greater than or equal to N;

detecting an indicated position by obtaining N number of frequency components contained in a reception signal, which corresponds to said N number of transmission signals at N different frequencies, received by the receiving conductors;

detecting noise components in the reception signal at the N different frequencies; and determining whether the same set of the N different frequencies is to be supplied next or not based on the noise components detected in the detecting step.

15. The method according to claim 14, wherein the detecting step includes detecting noise components in the reception signal at the N different frequencies while supply of said N number of transmission signals to the plurality of transmitting conductors is suspended.

16. The method according to claim 14, further comprising, in case the determining step determines that the same set of the N different frequencies is not to be supplied next, substituting one or more of the frequencies, at which the detected noise components are equal to or larger than a threshold, with different one or more frequencies selected from the M number of different frequencies.

17. A processor, utilized with a conductor pattern having a plurality of transmitting conductors extending in a direction and a plurality of receiving conductors extending in another direction and a memory, the processor being configured to execute instructions stored in the memory, the instructions comprising the steps of:

supplying N number of transmission signals at N different frequencies, respectively, selected from M number of different frequencies, to the plurality of transmitting conductors, where N and M are integers and M is greater than or equal to N;

detecting an indicated position by obtaining N number of frequency components contained in a reception signal, which corresponds to said N number of transmission signals at N different frequencies, received by the receiving conductors;

detecting noise components in the reception signal at the N different frequencies; and determining whether the same set of the N different frequencies is to be supplied next or not based on the noise components detected in the detecting step.

18. The processor according to claim 17, wherein the detecting step includes detecting noise components in the reception signal at the N different frequencies while supply of said N number of transmission signals to the plurality of transmitting conductors is suspended.

19. The processor according to claim 17, wherein the instructions further comprise, in case the determining step determines that the same set of the N different frequencies is not to be supplied next, substituting one or more of the frequencies, at which the detected noise components are equal to or larger than a threshold, with different one or more frequencies selected from the M number of different frequencies.

20. The processor according to claim 19, wherein the substituting step includes disconnecting one or more transmission signal suppliers at said one or more noisy frequencies from the plurality of transmitting conductors and connecting one or more transmission signal suppliers at said different one or more substitute frequencies to the plurality of transmitting conductors.

21. The processor according to claim 19, wherein the substituting step includes controlling one or more transmission signal suppliers at said one or more noisy frequencies to supply, instead, transmission signals at said different one or more substitute frequencies.

* * * * *